United States Patent

Tanuma et al.

[11] Patent Number: 5,917,569
[45] Date of Patent: Jun. 29, 1999

[54] LCD WITH PARTICULAR RUBBING TECHNIQUES AND HAVING DIFFERENT ANCHORING ENERGIES BETWEEN PIXEL AND NON-PIXEL REGIONS

[75] Inventors: Seiji Tanuma; Takashi Sasabayashi; Takatoshi Mayama, all of Kawasaki, Japan

[73] Assignee: Fujitsu Limited, Kanagawa, Japan

[21] Appl. No.: 08/971,048

[22] Filed: Nov. 14, 1997

Related U.S. Application Data

[62] Division of application No. 08/518,687, Aug. 24, 1995, Pat. No. 5,718,839.

[30] Foreign Application Priority Data

Aug. 26, 1994 [JP] Japan .................................. 6-202372
Sep. 26, 1994 [JP] Japan .................................. 6-229467
Jul. 31, 1995 [JP] Japan .................................. 7-194810

[51] Int. Cl.$^6$ .......................... G02F 1/136; G02F 1/1337; G02F 1/141
[52] U.S. Cl. .......................... 349/123; 349/124; 349/126; 349/136; 349/42
[58] Field of Search ................................... 349/123, 124, 349/126, 42, 128, 136

[56] References Cited

U.S. PATENT DOCUMENTS

| | | | |
|---|---|---|---|
| 5,032,313 | 7/1991 | Goto et al. | 252/299.63 |
| 5,221,981 | 6/1993 | Kodera et al. | 349/124 |
| 5,308,543 | 5/1994 | Sasaki et al. | 252/299.63 |
| 5,330,679 | 7/1994 | Sasaki et al. | 252/299.63 |
| 5,389,289 | 2/1995 | Rieger et al. | 252/299.01 |
| 5,400,159 | 3/1995 | Takao et al. | 349/124 |
| 5,654,780 | 8/1997 | Hasegawa et al. | 349/136 |
| 5,666,178 | 9/1997 | Hirata et al. | 349/136 |
| 5,680,189 | 10/1997 | Shimizu et al. | 349/123 |
| 5,801,801 | 9/1998 | Cnossen | 349/128 |

OTHER PUBLICATIONS

Lee et al.; 44.2: Control of the LC Alignment Using a Stamped Morphology Method and Its Application to LCDs; SID 93 Digest; pp. 957–960.

Schadt, et al.; Surface–Induced Parallel Alignment of Liquid Crystals by Linearly Polymerized Photopolymers; Jpn. J. Appln. Phys. vol. 31 (1992) pp. 2155–2164; Part 1, No. 7, Jul. 1992.

Murata et al.; Alignment of Nematic Liquid Crystals by Polyimide Langmuir–Blodgett Films; Jpn. J. Appln. Phys. vol. 31 (1992) pp. L 189–L 192; Part 2, No. 2B, Feb. 15, 1992.

Yokoyama et al.; Temperature dependence of the anchoring strength at a nematic liquid crystal–evaporated SiO interface; J. Appl. Phys. 61 (9), May 1, 1987; pp. 4501–4518.

*Primary Examiner*—William L. Sikes
*Assistant Examiner*—Toan Ton
*Attorney, Agent, or Firm*—Armstrong, Westerman, Hattori, McLeland & Naughton

[57] ABSTRACT

The liquid crystalline material of the present invention comprises a compound represented by the following structural formula (1), compounds represented by the structural formulas (1) and (2), compounds represented by the structural formulas (1) and (3), or compounds represented by the structural formulas (1), (2) and (3) in an amount of 90% by weight or more of the total amount of liquid crystalline components contained therein:

-continued

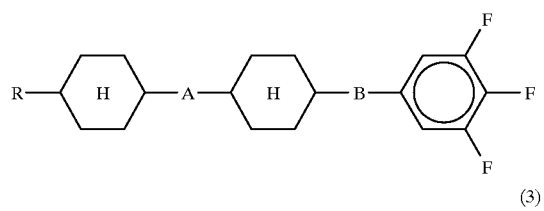
(2)

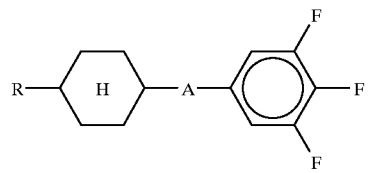
(3)

wherein R represents a linear alkyl group, $C_nH_{2n+1}$ in which n is 3, 4, 5, 6 or 7, A represents —$CH_2CH_2$— or direct bond (—) without —$CH_2CH_2$—, and B represents —$CH_2CH_2$— or direct bond (—) without —$CH_2CH_2$—. Further, under the above conditions, the components are blended so that the nematic-isotropic transition temperature of the liquid crystalline material can be 55° C. to 75° C. A liquid crystal display panel of TN type obtained by using the thus-obtained liquid crystalline material is operable with a low voltage of 2.5 V or lower. A display panel of which power consumption is low can thus be attained.

13 Claims, 23 Drawing Sheets

FIG. 1 (PRIOR ART)

Liquid crystalline material I

| | Structural formulas | wt % |
|---|---|---|
| (1) | $C_2H_5$—(H)—(H)—(O)—F, F | 8 |
| (2) | $C_2H_5$—(H)—(O)—(O)—F, F | 6 |
| (3) | $C_3H_7$—(H)—(H)—(O)—F, F | 7 |
| (4) | $C_3H_7$—(H)—(O)—(O)—F, F | 5 |
| (5) | $C_5H_{11}$—(H)—(H)—(O)—F, F | 3 |
| (6) | $C_5H_{11}$—(H)—(O)—(O)—F, F | 11 |
| (7) | $C_5H_{11}$—(H)—(O)—(O)—F, F, F | 7 |
| (8) | $C_3H_7$—(H)—(H)—(O)—F, F, F | 10 |
| (9) | $C_3H_7$—(H)—(H)—$C_2H_4$—(O)—F, F, F | 24 |
| (10) | $C_5H_{11}$—(H)—(H)—$C_2H_4$—(O)—F, F, F | 19 |

FIG.2 (PRIOR ART)

Liquid crystalline material II

| | Structural formulas | wt% |
|---|---|---|
| (1) | C$_3$H$_7$—⟨H⟩—⟨O⟩—⟨O⟩(F,F,F) | 15 |
| (2) | C$_5$H$_{11}$—⟨H⟩—⟨O⟩—⟨O⟩(F,F,F) | 14 |
| (3) | C$_3$H$_7$—⟨H⟩—⟨H⟩—⟨O⟩(F,F,F) | 8 |
| (4) | C$_4$H$_9$—⟨H⟩—⟨H⟩—⟨O⟩(F,F,F) | 4 |
| (5) | C$_3$H$_7$—⟨H⟩—⟨H⟩—C$_2$H$_4$—⟨O⟩(F,F,F) | 27 |
| (6) | C$_5$H$_{11}$—⟨H⟩—⟨H⟩—C$_2$H$_4$—⟨O⟩(F,F,F) | 20 |
| (7) | C$_4$H$_9$—⟨H⟩—C$_2$H$_4$—⟨H⟩—⟨O⟩(F,F,F) | 10 |
| (8) | C$_7$H$_{15}$—⟨H⟩—⟨O⟩(F,F,F) | 2 |

FIG. 4

| | Structural Formulas | wt% example |
|---|---|---|
| ① | $C_3H_7$—(H)—(O)—(O)⟨F, F, F⟩ | 35 |
| ② | $C_5H_{11}$—(H)—(O)—(O)⟨F, F, F⟩ | 34 |
| ③ | $C_3H_7$—(H)—(H)—(O)⟨F, F, F⟩ | — |
| ④ | $C_4H_9$—(H)—(H)—(O)⟨F, F, F⟩ | — |
| ⑤ | $C_3H_7$—(H)—(H)—$C_2H_4$—(O)⟨F, F, F⟩ | 15 |
| ⑥ | $C_5H_{11}$—(H)—(H)—$C_2H_4$—(O)⟨F, F, F⟩ | — |
| ⑦ | $C_4H_9$—(H)—$C_2H_4$—(H)—(O)⟨F, F, F⟩ | 8 |
| ⑧ | $C_5H_{11}$—(H)—$C_2H_4$—(H)—(O)⟨F, F, F⟩ | 8 |
| ⑨ | $C_7H_{15}$—(H)—(O)⟨F, F, F⟩ | — |
| | $V_{sat}(V)$ | 2.46 |

FIG.6 (PRIOR ART)

| | structural formulas | rate of content (wt%) | | | |
|---|---|---|---|---|---|
| | | (1) | (2) | (3) | (4) |
| ① | $C_3H_7$—(H)—(O)—(O)—F, F, F | 15 | 10 | 16 | 26 |
| ② | $C_5H_{11}$—(H)—(O)—(O)—F, F, F | 14 | 20 | 16 | 23 |
| ③ | $C_3H_7$—(H)—(H)—(O)—F, F, F | 8 | 8 | 8 | — |
| ④ | $C_4H_9$—(H)—(H)—(O)—F, F, F | 4 | 4 | 4 | — |
| ⑤ | $C_3H_7$—(H)—(H)—$C_2H_4$—(O)—F, F, F | 27 | 22 | 21 | 20 |
| ⑥ | $C_5H_{11}$—(H)—(H)—$C_2H_4$—(O)—F, F, F | 20 | 19 | 16 | 17 |
| ⑦ | $C_4H_9$—(H)—$C_2H_4$—(H)—(O)—F, F, F | 10 | 8 | 10 | 8 |
| ⑧ | $C_5H_{11}$—(H)—$C_2H_4$—(H)—(O)—F, F, F | — | — | — | — |
| ⑨ | $C_7H_{15}$—(H)—(O)—F, F, F | 2 | — | 9 | 6 |
| | $V_{sat}$ (V) | 2.73 | 2.71 | 2.63 | 2.61 |

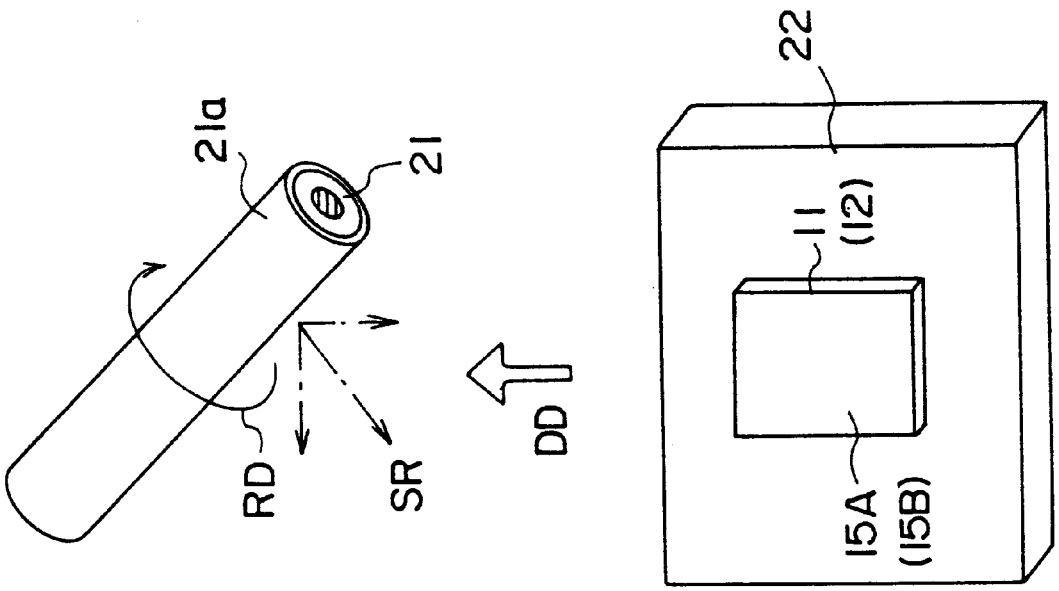
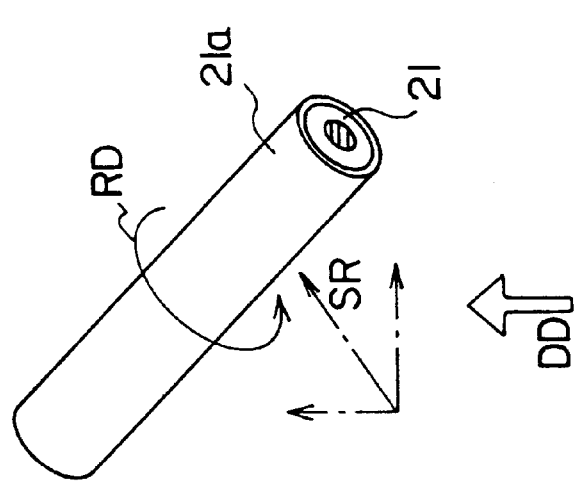
FIG.13(a)
FIG.13(b)

Pushing degree of cloth : 0.3mm

Moving speed of transparent substrate
: 350mm/sec

Rotational speed of rubbing role
: 300rpm

LCD WITH PARTICULAR RUBBING TECHNIQUES AND HAVING DIFFERENT ANCHORING ENERGIES BETWEEN PIXEL AND NON-PIXEL REGIONS

This is a Division, of application Ser. No. 08/518,687 filed Aug. 24, 1995, now U.S. Pat. No. 5,718,839.

BACKGROUND OF THE INVENTION

1. Field of the Invention

The present invention relates to a liquid crystalline material and a liquid crystal display panel. More specifically, the present invention relates to a liquid crystalline material comprising a liquid crystalline molecule which has three fluorine atoms bonded to the terminal end thereof, and to a TN-type liquid crystal display panel using the liquid crystalline material.

2. Description of the Prior Art

Liquid crystal display panels of TN (twisted nematic) type are now being employed in a wide variety of fields. In particular, liquid crystal display panels of so-called active matrix type, in which pixels made from a TN-type liquid crystal are directly operated by an active element such as a thin film transistor (TFT), have display characteristics comparable to those of CRT. They are therefore extensively applied to liquid crystal televisions, personal computers and the like.

Further, liquid crystal display panels are characterized by low power consumption, so that they are often utilized to portable apparatus such as personal computers of lap-top and notebook types. For such portable apparatus, it is required to make the power consumption of their liquid crystal display panel as low as possible in order to extend the time operable by a battery. To lower voltage required to operate the display panel is one means to fulfill the above requirement, and various studies have been carried out for this purpose.

A liquid crystalline material which is operable with low voltages is now being developed; such a material can be one solution to lower voltage required to operate a liquid crystal display panel.

A liquid crystalline material comprising as a main component a molecule which contains as a polar group one or two fluorine atoms (—F) or —OCF$_3$ groups at the terminal end thereof has been used as the liquid crystalline material operable with low voltages. However, an on-drive voltage of approximately 5 V is needed to operate a liquid crystal display panel obtained by using such a liquid crystalline material, and it is the present situation that when this liquid crystal display panel is operated by a battery, the battery has to be changed in a short period of time.

Recently, in order to obtain liquid crystalline materials operable with lower voltages, liquid crystalline molecules having an increased anisotropy of dielectric constant Δ∈, obtained by increasing the number of polar groups at the terminal end of a molecule which composes a liquid crystal are being put into practical use. Such liquid crystalline molecules include those molecules which have three fluorine atoms bonded to benzene ring positioned at the terminal end thereof. They are represented by the following structural formulas (1), (2) and (3):

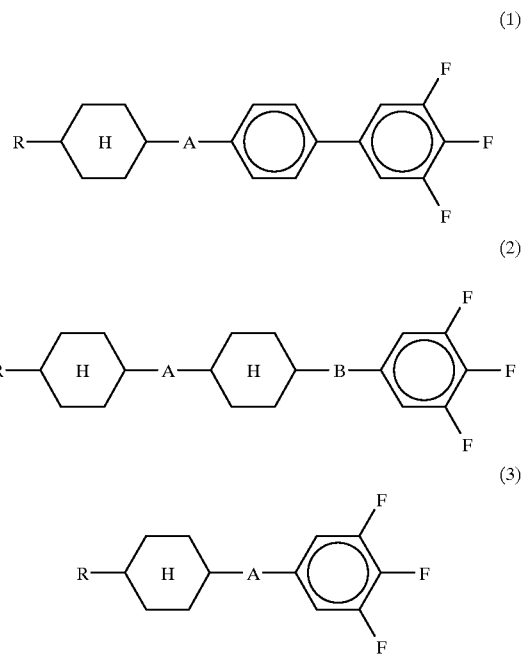

wherein R represents a linear alkyl group, $C_nC_{2n+1}$ in which n is 3, 4, 5, 6 or 7, A represents —CH$_2$CH$_2$— or direct bond (—) without —CH$_2$CH$_2$—, and B represents —CH$_2$CH$_2$— or direct bond (—) without —CH$_2$CH$_2$—.

For instance, liquid crystalline materials I and II shown in FIGS. 1 and 2 have been known as those which contain the above-described molecules.

The liquid crystalline material I shown in FIG. 1 is one which is obtained by incorporating the molecules represented by the structural formulas (1), (2) and (3) into conventional liquid crystalline components. The components (7) to (10) shown in FIG. 1 correspond to the molecules having the formulas (1), (2) and (3). The liquid crystalline material II shown in FIG. 2 is one which contains as main components the molecules represented by the structural formulas (1), (2) and (3). When the liquid crystalline material I or II is practically used as a material for a liquid crystal display panel, a chiral material is added to the liquid crystalline components shown in FIGS. 1 or 2. However, the wt % values shown in FIGS. 1 and 2 represent the proportions of the liquid crystalline components in the liquid crystalline materials which contain no chiral material.

These two liquid crystalline materials shown in FIGS. 1 and 2 have a high anisotropy of dielectric constant Δ∈ of approximately 7 to 9, and are operable with a lower voltage of approximately 3 V.

However, a liquid crystalline material which is operable with a low voltage of approximately 2.5 V has not been obtained so far even by utilizing any one of the molecules represented by the structural formulas (1), (2) and (3). For instance, even the liquid crystalline material shown in FIG. 2 has an anisotropy of dielectric constant Δ∈ of 8.7, and requires an operating voltage of at least 3 V.

For the purpose of decreasing the power consumption of liquid crystal display panels, approximately 3 V is not sufficiently low as voltage to operate a liquid crystalline material, and a liquid crystalline material which is operable with a voltage of lower than 3 V, for example, a voltage of approximately 2.5 V or lower is required.

Next, a pixel in a-conventional active element type liquid crystal display panel and a peripheral structure of the display panel are described with reference to FIGS. 11(a) and 11(b). FIG. 11(a) is a plan view showing a pixel of a liquid crystal panel and an arrangement of bus lines, and FIG. 11(b) is a cross sectional view taken generally along a line I—I of FIG. 11(a).

As shown in FIGS. 11(a) and 11(b), a plurality of scanning bus lines 14 formed out of a metal such as Cr are arranged far from each other at prescribed intervals on a first plane of a first transparent substrate 11, and a plurality of data bus lines 19 are arranged far from each other at prescribed intervals on the scanning bus lines 14 through an insulating film (not shown) to cross over the lines 14. The data bus lines 19 extend in a direction perpendicular to another direction in which the scanning bus lines 14 extend.

A pixel electrode 13 is arranged on a portion of the first transparent substrate 11 surrounded by each of the scanning bus lines 14 and each of the data bus lines 19. Each of the pixel electrodes 13 is connected to one of the data bus lines 19 through an active element 20, and each of the active elements 20 is actuated by a voltage applied from one of the scanning bus lines 14. A thin-film transistor (TFT) or a metal-insulator-metal (MIM) diode is used as the active element 20.

The scanning bus lines 14, the data bus lines 19, the active elements 20 and the pixel electrodes 13 are covered by a first alignment film 15A. Also, on a first plane of a second transparent substrate 12, a transparent electrode 16 and a second alignment film 15B are arranged in that order. The first transparent substrate 11 and the second transparent substrate 12 are arranged on condition that the first alignment film 15A face the second alignment film 15B, and a liquid crystal 17 is packed in a region between the first alignment film 15A and the second alignment film 15B. In addition, a polarizing plate 18A is arranged on a second plane of the first transparent substrate 11, and a polarizing plate 18B is arranged on a second plane of the second transparent substrate 12.

To operate the active element type liquid crystal display panel by applying a low voltage to the display panel, the improvement of the display panel has been actively studied. For example, the research of the display panel has been mainly made to improve a liquid crystal material or to lengthen a chiral pitch of a liquid crystal molecule.

However, another type of technical improvement is required as well as the above improvement of the display panel to operate the display panel by applying a much lower voltage to the display panel.

SUMMARY OF THE INVENTION

The present invention has been accomplished in order to solve the aforementioned problems in the conventional liquid crystalline materials.

Accordingly, an object of the present invention is to provide a liquid crystalline material which is operable with lower voltages, and to a liquid crystal display panel using such a material.

The present invention provides a liquid crystalline material which comprises a compound represented by the structural formula (1), compounds represented by the structural formulas (1) and (2), compounds represented by the structural formulas (1) and (3), or compounds represented by the structural formulas (1), (2) and (3) in an amount of 90% by weight or more of the total weight of liquid crystalline components contained therein, provided that the weight of the compound represented by the structural formula (1) is 60% or more of the total weight of the liquid crystalline components:

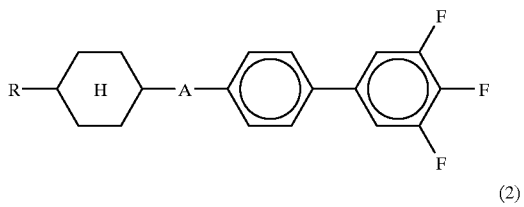

(1)

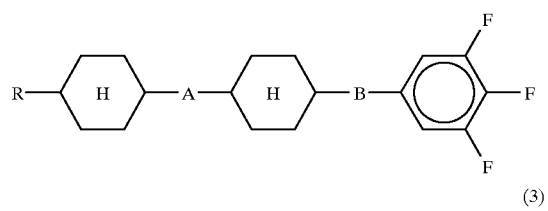

(2)

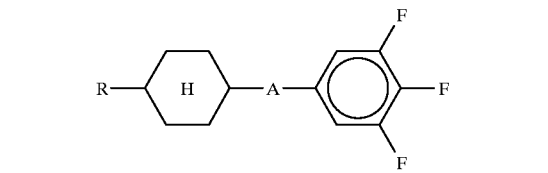

(3)

wherein R represents a linear alkyl group, $C_nC_{2n+1}$ in which n is 3, 4, 5, 6 or 7, and A and B represent —$CH_2CH_2$— or direct bond (—) without —$CH_2CH_2$—. In addition, structural formula (4) shown below represents benzene ring, and structural formula (5) represents cyclohexane ($C_6H_6$).

(4)

(5)

By using this liquid crystalline material, a liquid crystal display panel which is operable with a lower voltage of approximately 2.5 V can be obtained.

This liquid crystalline material is compared with a liquid crystalline material in which the total weight of the molecules represented by the structural formulas (1), (2) and (3) is 90% by weight or more of the total weight of liquid crystalline components contained therein and in which the weight of the molecule represented by the structural formula (1) is less than 60% by weight of the total weight of the liquid crystalline components. As a result, they were found to be almost the same in anisotropy of dielectric constant $\Delta\in$. Therefore, it can be considered that the reason why the threshold voltage is lowered by the use of the material of the present invention is not due to the effect of anisotropy of dielectric constant but because the liquid crystalline material has a lower elastic modulus.

Further, although the N-I (nematic-isotropic) transition temperatures of liquid crystals are, in general, in the range of 75 to 110° C., that of the above-described material of the present invention is in the range of 55 to 75° C. This fact is therefore considered to be one of the reasons why a liquid crystal display panel prepared by using the material of the present invention is operable with a lower voltage of 2.5 V or lower.

Furthermore, it was experimentally confirmed that the operating voltage can be further lowered when the twist angle of the above-described liquid crystalline material of the present invention is increased from 90°, which is a generally selected angle, to 95 to 110° in a display panel.

One of the reasons why a high voltage is required to operate a liquid crystal display panel is that liquid crystalline molecules which are closest to the surfaces of layers by which the liquid crystalline material is sandwiched do not immediately respond to applied voltage. By adjusting the twist angle of the liquid crystalline molecules to 95 to 110°, and making the polarization angle of polarizers different from the twist angle of the liquid crystalline molecules, incident light is to enter from a direction shifted from the direction of alignment of the liquid crystalline molecules. It is therefore considered that the effect of the liquid crystalline molecules which are late in response can be decreased by the above means.

The other object of the present invention is to provide, with due consideration to the drawbacks of such a conventional, a liquid crystal display apparatus in which an operating voltage is moreover lowered and a manufacturing method of the apparatus.

The other object is achieved by the provision of a liquid crystal display apparatus, comprising: a first substrate; a second substrate, a first surface of the second substrate facing a first surface of the first substrate; a scanning wiring line extending toward a scanning direction between the first substrate and the second substrate facing each other; a data wiring line extending toward a data direction between the first substrate and the second substrate on condition that the data wiring line crosses over the scanning wiring line in insulation condition; a first alignment film arranged on the first surface of the first substrate, a pixel region of the first alignment film being placed in a crossing-over portion of the first alignment film in which the scanning wiring line crosses over the data wiring line or being placed in a surrounding portion of the first alignment film surrounded by the scanning wiring line and the data wiring line; a second alignment film arranged on the first surface of the second substrate, a pixel region of the second alignment film being placed in a crossing-over portion of the second alignment film in which the scanning wiring line crosses over the data wiring line or being placed in a surrounding portion of the second alignment film surrounded by the scanning wiring line and the data wiring line; and a liquid crystal packed between the first alignment film and the second alignment film, liquid crystal molecules of the liquid crystal being arranged on a first surface of the first alignment film or a first surface of the second alignment film, wherein an anchoring energy of liquid crystal molecules placed on the pixel region of the first alignment film or placed on the pixel region of the second alignment film is lower than that of liquid crystal molecules placed on a remaining portion of the first or second alignment film out of the pixel region.

In the above configuration, an anchoring energy of liquid crystal molecules placed on the pixel region of the first or second alignment film is lowered, and an anchoring energy of liquid crystal molecules which are placed on other portions of the first or second alignment film surrounding the pixel region is heightened. Therefore, postures of the liquid crystal molecules placed on the pixel region of the first or second alignment film can easily change. That is, even though a low voltage is applied to the scanning wiring line, the liquid crystal molecules placed on the pixel region of the first or second alignment film quickly rise up, and the liquid crystal display apparatus can be operated.

Also, because postures of the liquid crystal molecules placed on the other portions of the first or second alignment film surrounding the pixel region hardly change, even though an electric field is generated around the pixel region, any adverse influence of the electric field does not exert on the liquid crystal molecules placed on the other portions of the first or second alignment film, and the postures of the liquid crystal molecules placed on the other portions of the first or second alignment film are not changed by the electric field. Accordingly, the generation of defective pixel caused by a lateral component of an electric field generated between the pixel region and the scanning wiring line or between the pixel region and the data wiring line can be prevented.

The object is also achieved by the provision of a liquid crystal display apparatus, comprising: a first substrate; a plurality of scanning wiring lines arranged on a first surface of the first substrate and spaced at prescribed intervals; a plurality of data wiring lines arranged on the first surface of the first substrate and spaced at prescribed intervals on condition that the data wiring lines cross over the scanning wiring lines in insulation condition; a plurality of pixel electrodes respectively arranged on a portion of the first substrate surrounded by one of the scanning wiring lines and one of the data wiring lines; a plurality of active elements, arranged on the first surface of the first substrate, for electrically connecting the pixel electrodes to the data wiring lines in one-to-one correspondence in cases where a voltage signal is applied to the scanning lines; a first alignment film arranged on the first surface of the first substrate, the pixel electrodes, the scanning wiring lines and the data wiring lines, a plurality of pixel regions of the first alignment film being placed just over the pixel electrodes, a plurality of off-pixel regions of the first alignment film being placed on regions out of the pixel electrodes to surround the pixel regions, an anchoring energy of liquid crystal molecules placed on the pixel regions of the first alignment film being lower than that of liquid crystal molecules placed on the off-pixel regions of the first alignment film; a second substrate of which a first surface faces the first surface of the first substrate; a counter electrode arranged on the first surface of the second substrate; a second alignment film arranged on the counter electrode; and a liquid crystal arranged between the first alignment film and the second alignment film, the liquid crystal being composed of a plurality of liquid crystal molecules.

In the above configuration, an anchoring energy of liquid crystal molecules placed on the pixel regions of the first alignment film, which are arranged on the first substrate on which the scanning wiring lines and the data wiring lines are arranged, is lower than that of liquid crystal molecules placed on the off-pixel regions of the first alignment film. Therefore, even though a low voltage is applied to the scanning wiring line, the liquid crystal molecules quickly rise up, and the liquid crystal display apparatus can be operated. Also, even though an intensity of electric field caused by a potential difference between each wiring line and each pixel electrode is strong in the off-pixel regions of the first alignment film, any adverse influence of the electric field does not exert on the liquid crystal molecules. Accordingly, the generation of defective pixel caused by a lateral component of the electric field can be prevented.

Also, it is preferred that each of the pixel regions of the first alignment film be composed of a central region and a peripheral region surrounding the central region, and an anchoring energy of liquid crystal molecules placed on the peripheral regions of the first alignment film be higher than that of liquid crystal molecules placed on the central regions of the first alignment film.

Even though the peripheral regions of the first alignment film are placed just over the pixel electrodes, there is a case that liquid crystal molecules placed on the peripheral regions are influenced by the electric field. In this case, an anchoring energy of liquid crystal molecules placed on the peripheral regions is heightened. Therefore, the generation of defective pixels can be reliably prevented.

The object is also achieved by the provision of a manufacturing method of a liquid crystal display apparatus, comprising the steps of: forming a first alignment film on a first substrate; forming a second alignment film on a first surface of a second substrate; defining a pixel region of the first alignment film; defining a pixel region of the second alignment film; defining an off-pixel region of the first alignment film surrounding the pixel region of the first alignment; defining an off-pixel region of the second alignment film surrounding the pixel region of the second alignment; rubbing the pixel region of the first or second alignment film with a rubbing cloth according to an opposite-directional rubbing in which a rubbing direction of the rubbing cloth on the pixel region of the first or second alignment film includes a directional component opposite to that of a moving direction of the first or second alignment film moved relatively to the rubbing cloth; rubbing the off-pixel region of the first or second alignment film with a rubbing cloth according to a same-directional rubbing in which a rubbing direction of the rubbing cloth on the off-pixel region of the first or second alignment film includes the same directional component as that of a moving direction of the first or second alignment film moved relatively to the rubbing cloth; and packing liquid crystal between the first and second alignment films on condition that the first surface of the first substrate faces the first surface of the second substrate and the pixel region of the second alignment film is placed just above the pixel region of the first alignment film.

A forming method of an alignment film having a region in which an anchoring energy of liquid crystal molecules is low and another region in which an anchoring energy of liquid crystal molecules is high is described.

It is empirically well-known that a saturation energy of liquid crystal changes by changing a material of an alignment film or a rubbing condition. The material of the alignment film cannot be arbitrarily chosen because the selection of the material is limited by characteristics having no relation to an operating voltage applied to the display panel, such as a voltage retention of the alignment film. Therefore, the inventors of the present invention notice that the saturation voltage changes by changing a rubbing condition, and a relationship between the rubbing condition and the change of the saturation voltage is examined in detail.

As a result of the examination, the inventors notice that a relationship between a light transmittance and the operating voltage in a liquid crystal display panel changes with a moving direction of an alignment film moved relatively to a rubbing cloth, as well as conventional well-known rubbing conditions such as a pushing degree of the rubbing roll in the alignment film, the number of rubbing operations repeated, a moving speed of a substrate and a rotational speed of a rubbing roll on which the rubbing roll is attached. That is, it is experimentally ascertained that an anchoring energy in an alignment film rubbed according to an opposite-directional rubbing is heightened and an anchoring energy in an alignment film rubbed according to a same-directional rubbing is lowered. Here, the opposite-directional rubbing is defined as a rubbing condition that a rubbing direction of the rubbing cloth on the alignment film includes a directional component opposite to that of a moving direction of the alignment film moved relatively to the rubbing cloth. The same-directional rubbing is defined as a rubbing condition that a rubbing direction of the rubbing cloth on the alignment film includes the same directional component as that of a moving direction of the alignment film moved relatively to the rubbing cloth. The alignment film is, for example, moved by moving a substrate on which the alignment film is formed.

When a portion of the alignment film is rubbed according to the opposite-directional rubbing, the anchoring energy of liquid crystal molecules placed on the portion of the alignment film is lowered, and a ratio of a rising angle change of the liquid crystal molecules to an applied voltage is enlarged. Therefore, the liquid crystal display panel can be operated by adding a lower voltage to the display panel as compared with a conventional display panel.

However, when all surface of the alignment film is rubbed according to the opposite-directional rubbing, liquid crystal molecules placed on an off-pixel region of the alignment film are easily influenced by an electric potential of a scanning or data wiring line. Therefore, an abnormal region of the alignment film on which a rising direction of liquid crystal molecules differs from that of liquid crystal molecules placed on a normal region of the alignment film undesirable occurs.

In the above manufacturing method, the pixel region of the first or second alignment is rubbed according to the opposite-directional rubbing, and the off-pixel region of the first or second alignment is rubbed according to the same-directional rubbing. Therefore, an anchoring energy of liquid crystal molecules placed on the off-pixel region of the first or second alignment is heightened, and the occurrence of the abnormal region can be prevented.

It is preferred that the step of rubbing a pixel region include partitioning each of the pixel regions of the first and second alignment films into a central region and a peripheral region surrounding the central region, and rubbing the peripheral region of the first or second alignment film according to the same-directional rubbing. Also, it is preferred that the step of rubbing a pixel region includes partitioning each of the pixel regions of the first and second alignment films into a central region and a peripheral region near to the scanning wiring line, and rubbing the peripheral region of the first or second alignment film according to the same-directional rubbing.

In an active element type liquid crystal display apparatus, a pixel electrode is arranged on the first or second substrate to place the pixel electrode just under the pixel region of the first or second alignment film, and a distance between the pixel electrode and the scanning or data wiring line is, for example, narrowed to 10 $\mu$m or less to enlarge an opening ratio in the display panel. In this case, the influence of the electric field on the liquid crystal molecules placed on the pixel region of the first or second alignment film is increased, and the liquid crystal molecules placed on the pixel region surrounding the central region or near to the scanning wiring line abnormally rise toward various directions. To prevent the abnormal rising of the liquid crystal molecules, the peripheral region of the first or second alignment film is rubbed according to the same-directional rubbing, and an anchoring energy of the liquid crystal molecules is heightened.

Also, the object is achieved by the provision of a manufacturing method of a liquid crystal display apparatus, comprising the steps of: forming a scanning wiring line and a data wiring line on a first surface of a first substrate to make the scanning and data wiring lines cross over each other in insulation condition; forming a first alignment film on the first substrate to cover the scanning and data wiring lines; forming a second alignment film on a first surface of a second substrate; defining a pixel electrode region on a crossing-over region of the first substrate in which the scanning wiring line crosses over the data wiring line or on a surrounding region of the first substrate surrounded by the scanning and data wiring lines; defining a pixel region of the first alignment film placed just over the pixel electrode region and a pixel region of the second alignment film to be placed just above the pixel electrode region; rubbing an off-pixel region of the first or second alignment film surrounding the pixel region of the first or second alignment film; and packing liquid crystal between the first and second alignment films on condition that the first surface of the first substrate faces the first surface of the second substrate and the pixel region of the second alignment film is placed just above the pixel electrode region.

In the above manufacturing method, it is not required to rub the pixel region of the first or second alignment film for the purpose of lowering an anchoring energy of liquid crystal molecules placed on the pixel region. The off-pixel region of the first or second alignment film is rubbed according to a normal rubbing.

For example, it is preferred that the step of defining a pixel region include radiating an electro-magnetic wave to the pixel region of the first or second alignment film to orient liquid crystal molecules placed on the pixel region toward an axial direction. An anchoring energy of liquid crystal molecules placed on the pixel region radiated is lowered.

Also, it is preferred that the step of forming a first alignment film or the step of forming a second alignment film include forming a Langnuir-Blodgett film as the first or second alignment film. An anchoring energy of liquid crystal molecules placed on the pixel region which is made of the Langnuir-Blodgett film is lowered.

Also, it is preferred that the step of defining a pixel region include forming a plurality of grooves on the pixel region of the first or second alignment film to orient a plurality of liquid crystal molecules placed on the pixel region along an extending direction of the grooves without rubbing. An anchoring energy of liquid crystal molecules placed on the pixel region on which the grooves are dug in an extending direction is lowered.

Also, it is preferred that the step of forming a second alignment film include rubbing all surface of the second alignment film. In an active element type liquid crystal display apparatus, a pixel electrode is arranged in the pixel electrode region placed on the first substrate. Because the second alignment film is formed on the second substrate on which any pixel electrode is not arranged, any influence of the electric field is not strongly exerted on liquid crystal molecules placed on the second alignment film. Therefore, even though all surface of the second alignment film is rubbed, for example, according to the opposite-directional rubbing, the generation of defective pixels can be prevented.

BRIEF DESCRIPTION OF THE DRAWINGS

FIG. 1 is a table showing the composition of a conventional liquid crystalline material;

FIG. 2 is a table showing the composition of another conventional liquid crystalline material;

FIG. 4 is a table showing the composition of a liquid crystalline material of the first embodiment of the present invention, prepared in Example 1;

FIG. 6 is a table showing the compositions of first, second, third and fourth conventional liquid crystalline materials which were used to compare with the liquid crystalline materials of the first embodiment of the present invention;

FIG. 13(a) is an explanatory view showing another same-directional rubbing in which a rubbing roll is arranged obliquely to a moving direction of a transparent substrate;

FIG. 13(b) is an explanatory view showing another opposite-directional rubbing in which a rubbing roll is arranged obliquely to a moving direction of a transparent substrate;

DETAIL DESCRIPTION OF THE EMBODIMENTS

The embodiments of the present invention will now be explained by referring to the accompanying drawings.

The first embodiment of the present invention is characterized by using a liquid crystalline material which comprises a compound represented by the structural formula (1), compounds represented by the structural formulas (1) and (2), compounds represented by the structural formulas (1) and (3), or compounds represented by the structural formulas (1), (2) and (3) in an amount of 90% by weight or more of the total weight of liquid crystalline components contained therein, provided that the weight of the compound represented by the structural formula (1) is 60% or more of the total weight of the liquid crystalline components.

As defined previously, each one of the molecules represented by the structural formulas (1), (2) and (3) has three fluorine atoms bonded to benzene ring which is positioned at the terminal end thereof.

In order to further lower the operating voltage, the inventors carried out experiments by changing the proportion of a predetermined liquid crystalline component in a given liquid crystalline material which comprises as its main components (for example, 90% by weight or more of all of the liquid crystalline components contained therein) the compounds having the structural formulas (1), (2) and (3). By making the proportion of the component represented by the structural formula (1) to 60% by weight or more of the total weight of the components, voltage required to operate a liquid crystal display panel was lowered to a low value that had never been attained until then.

The following can be considered as the reason why the operating voltage was lowered:

Under the condition that only the molecules represented by the structural formulas (1), (2) and (3) are used as liquid crystalline components, a conventionally-known liquid crystalline material in which the proportion of the molecule having the structural formula (1) is less than 60% by weight, and a liquid crystalline material of the present invention in which the proportion of the molecule having the structural formula (1) is 60% by weight or more were compared. As a result, the conventional liquid crystalline material and the liquid crystalline material of the present invention were found to be almost the same in anisotropy of dielectric constant $\Delta\in$. It is therefore considered that voltage required to operate a liquid crystal display panel was lowered because of a decrease in elastic modulus of the liquid crystalline components.

(EXAMPLE 1)

A TFT driven liquid crystal display panel having 640×400 pixels was prepared. The partial cross-sectional view of this display panel is as shown in FIG. 3.

Figure 3:
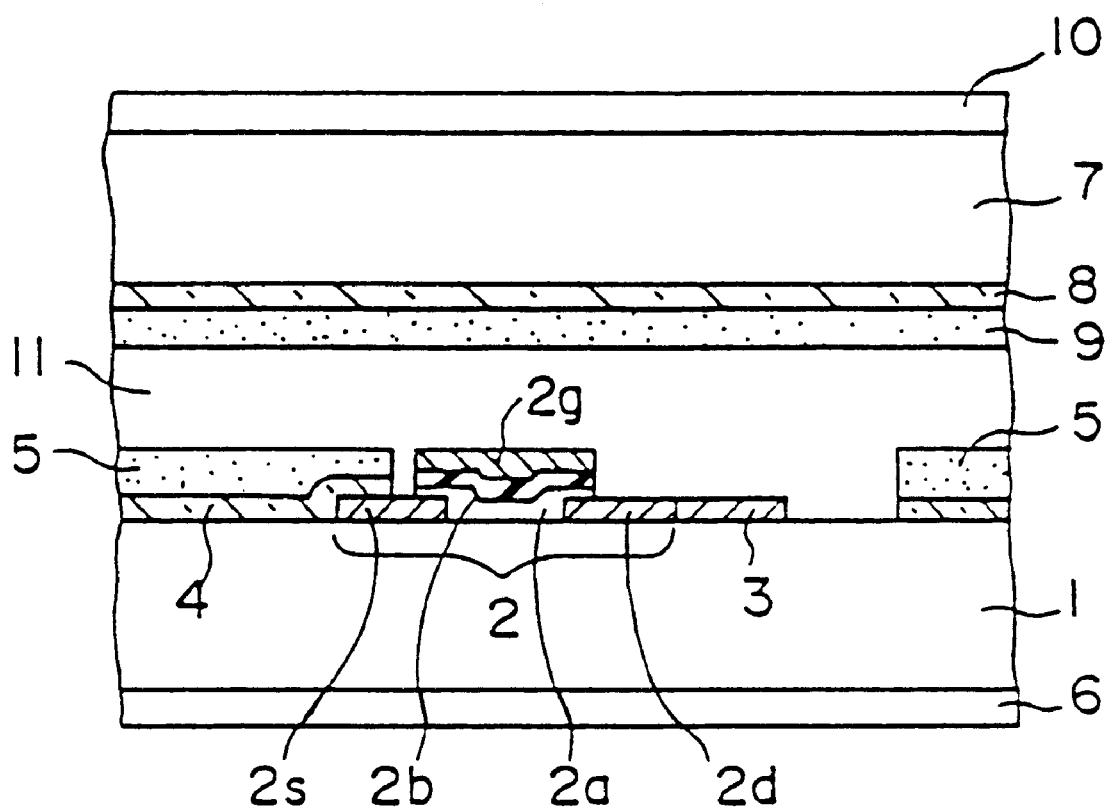
FIG. 3 is a cross-sectional view showing a part of a liquid crystal display panel of the first embodiment of the present invention, obtained in Example 1.

As shown in FIG. 3, a TFT 2, a drain bus line 3, a transparent pixel electrode 4, and a gate bus line (not illustrated) are provided on a first transparent substrate 1. A first alignment film 5 is formed at least on the transparent pixel electrode 4. The TFT 2 has, for example, a structure of stagger type; it has a source electrode 2s connected to the pixel electrode 4, a drain electrode 2d connected to the drain bus line 3, an operating semiconductor layer 2a connected to a part of the source electrode 2s and to a part of the drain electrode 2d, and a gate electrode 2g which is provided on a gate insulating layer 2b formed on the active semiconductor layer 2a. Further, a first polarizer 6 is provided on the other surface of the first transparent substrate 1. On a second transparent substrate 7, a transparent common electrode 8 and a second alignment film 9 are provided in the mentioned order. The second transparent substrate 7 faces the first transparent substrate 1 with the second alignment film 9 and the first alignment film 5 faced each other.

The first and second transparent substrates 1, 7 are made of glass, quartz or the like.

In the gap between the first and second alignment films 5, 9, a liquid crystalline material 11 having the composition shown in FIG. 4 was charged. The N-I transition temperature of the liquid crystalline material used was 59° C. In this example, liquid crystalline molecules of a plurality of types were used in order to control the temperature characteristics.

In FIG. 4, and in FIG. 6 which will be described later, the liquid crystalline molecules ① and ② correspond to the molecule represented by the structural formula (1), the liquid crystalline molecules ③ to ⑧ correspond to the molecule represented by the structural formula (2), and the liquid crystalline molecule ⑨ corresponds to the molecule presented by the structural formula (3).

A chiral material was further incorporated into the liquid crystalline material. The amount of the chiral material was adjusted so that the angle of the liquid crystalline molecules would be changed in approximately 90° to be a spiral form with a pitch of approximately 90 micrometers. The amount of the chiral material added was approximately 0.15% by weight of the liquid crystalline material.

Figure 5:
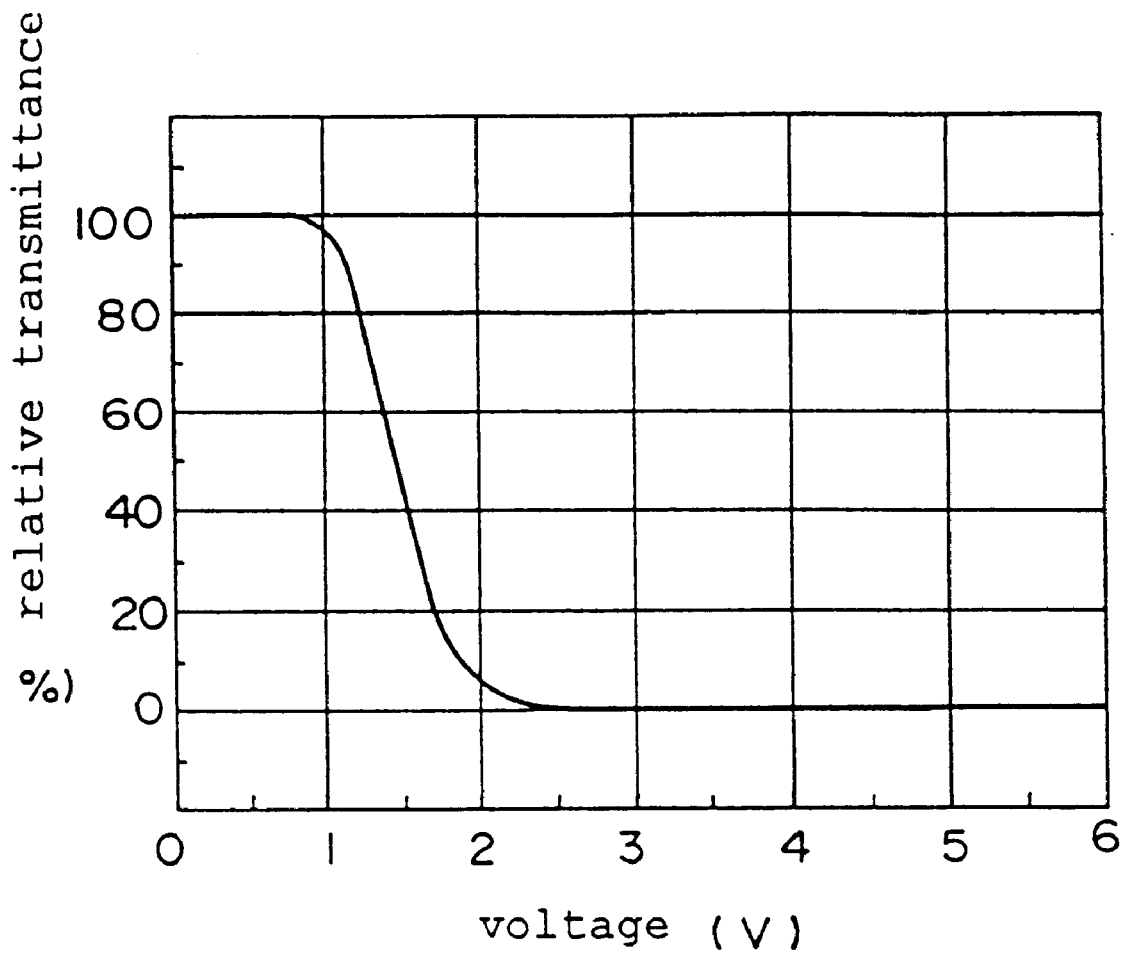
FIG. 5 is a graph showing the relationship between applied voltage and relative transmittance in the liquid crystal display panel of the first embodiment of the present invention, obtained in Example 1.

The liquid crystal display panel having the above-described structure is of a normally white type. The relationship between applied voltage and relative transmittance in this display panel was examined. As a result, a characteristic curve as shown in FIG. 5 was obtained. The applied voltage means a voltage between the pixel electrode 4 and the common electrode 8, and the relative transmittance is defined as a transmittance taken under the condition that the amount of transmitted light is set to be 100% when the applied voltage is 0 V. When the voltage at which the relative transmittance is 1% is referred to as a saturation voltage $V_{sat}$, the saturation voltage $V_{sat}$ of the liquid crystal display panel made by using the liquid crystalline material of this example is 2.46 V, which is lower than 2.5 V although the degree of lowering is small. It is noted that the saturation voltage $V_{sat}$ is defined as a voltage by which a contrast of 200 can be attained.

On the other hand, four types of liquid crystalline materials, each containing less than 60% by weight of the molecule represented by the structural formula (1) were prepared as shown in FIG. 6. Each of these materials was charged between the first and second substrates 1,7 shown in FIG. 3, and the saturation voltage $V_{sat}$ was measured. It is noted that the chiral pitch of each of the materials (1) to (4) shown in FIG. 6 is approximately 90 micrometers, The results of this experiment were as follows: the saturation voltage $V_{sat}$ of the material (1) was 2.73 V, that of the material (2) was 2.71 V, that of the material (3) was 2.63 V, and that of the material (4) was 2.61 V.

Figure 7:
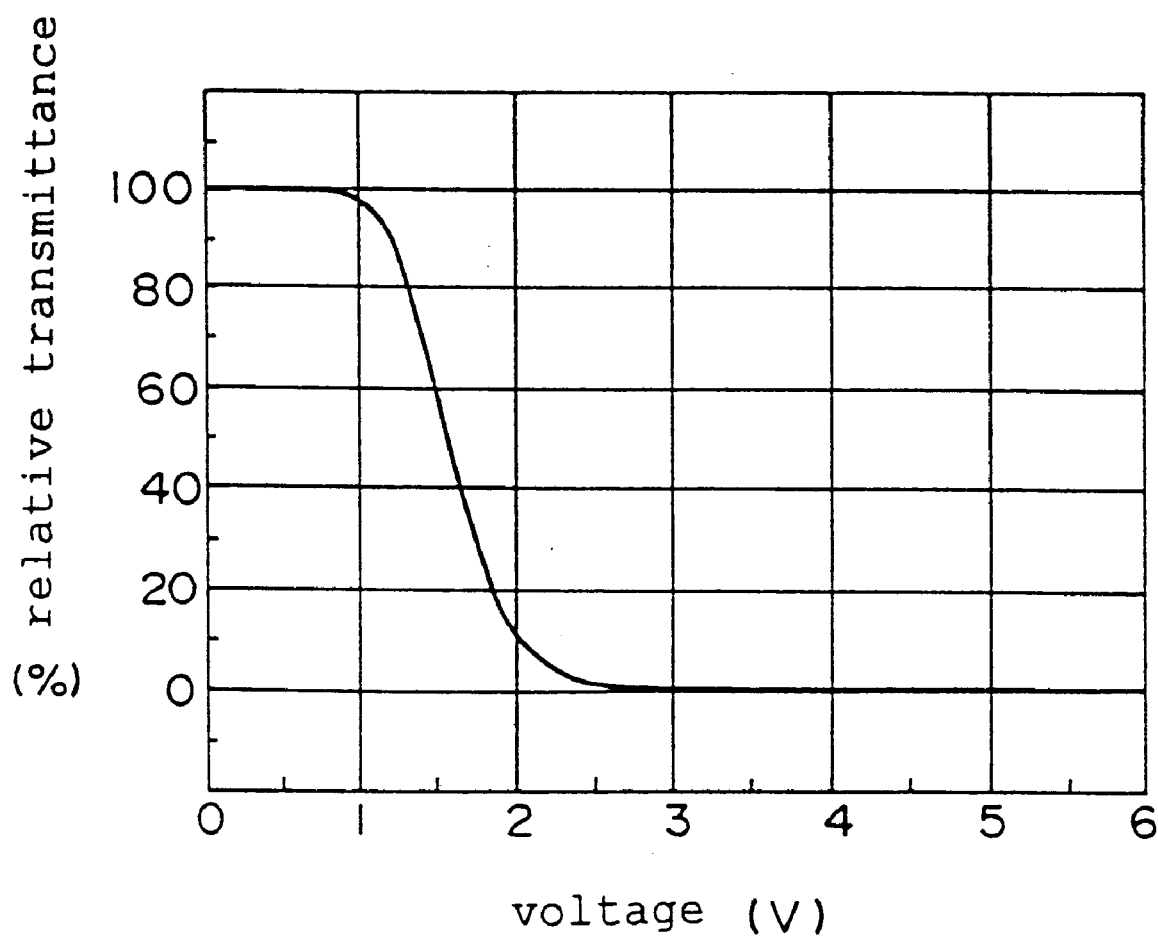
FIG. 7 is a graph showing the relationship between applied voltage and relative transmittance in a liquid crystal display panel which was made by using the first liquid crystalline material shown in FIG. 6.
Figure 8:
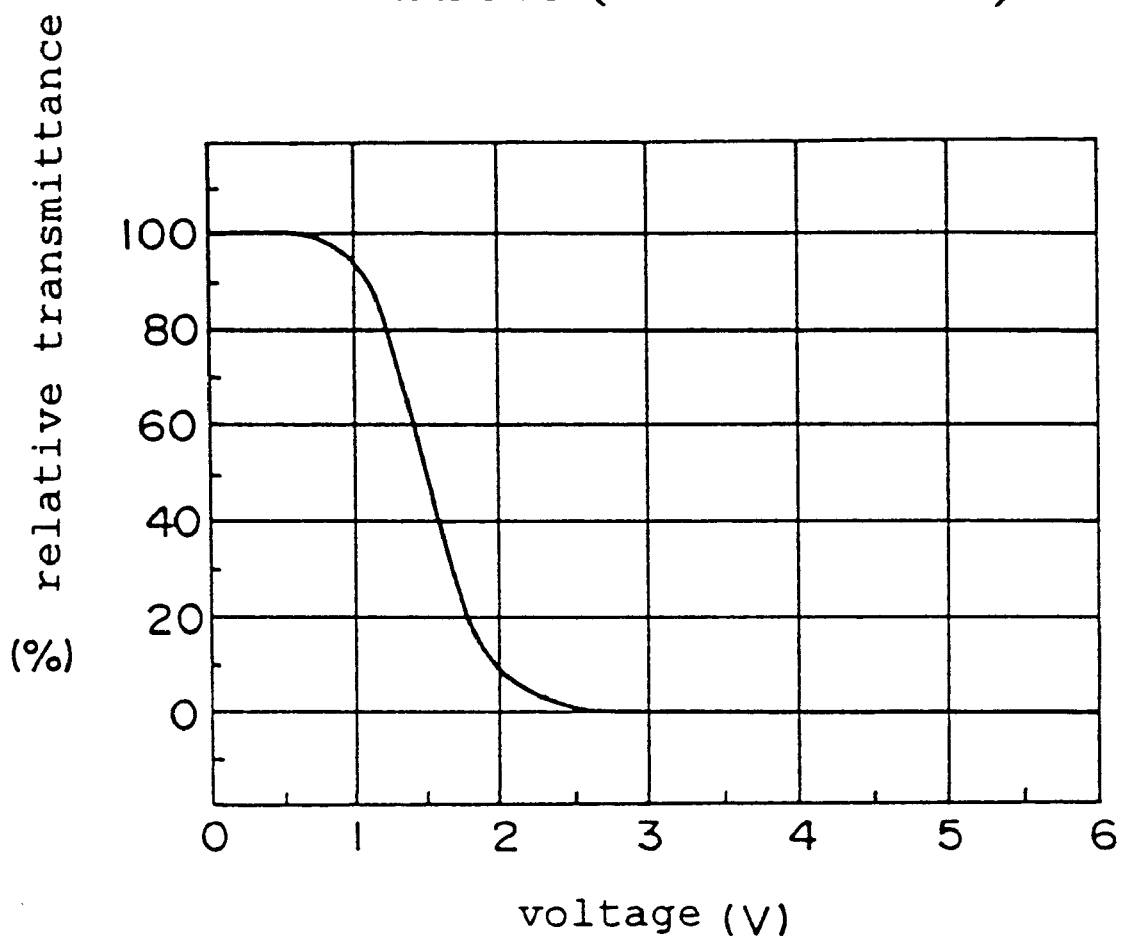
FIG. 8 is a graph showing the relationship between applied voltage and relative transmittance in a liquid crystal display panel which was made by using the fourth liquid crystalline material shown in FIG. 6.

For reference, the relationship between applied voltage and relative transmittance obtained by using the liquid crystalline material (1), and this relationship obtained by using the liquid crystalline material (4) are shown in FIG. 7 and FIG. 8, respectively.

As is clear from the above experimental results, when the proportion of the molecule having the structural formula (1) is less than 60% by weight, the saturation voltage $V_{sat}$ falls in the range of 2.6 to 2.8 V, and a desired low voltage of 2.5 V cannot be attained. In contrast, when the proportion of the molecule having the structural formula (1) is 60% by weight or more, a saturation voltage $V_{sat}$ of 2.5 V or lower can be successfully attained.

In this example, the liquid crystalline material shown in FIG. 4, having an N-I transition temperature of 59° C. was used. For reference, liquid crystalline materials having an N-I transition temperature of 55 to 57° C., prepared by changing the proportions of the molecules represented by the structural formulas (1), (2) and (3) were also subjected to the determination of saturation voltage. As a result, it was found that the saturation voltage $V_{sat}$ of any of these materials never exceeded 2.5 V. The reason of this fact may be such that these liquid crystalline materials were to have a lower elastic modulus as the N-I transition temperature thereof became lower, and, as a result, a lower saturation voltage was obtained.

(EXAMPLE 2)

A liquid crystal display panel of TFT-operated type, having the same structure as shown in FIG. 3 was prepared also in this example, provided that the direction of rubbing the first alignment film 5 and that of rubbing the second alignment film 9 were made different from those in Example 1; these alignment films were rubbed so that the twist angle would be 100°. A liquid crystalline material 11 charged between the first and second alignment films 5, 9 was also the same as the material used in Example 1, shown in FIG. 4.

When the twist angle is made wider, a negatively-twisted area tends to be formed. In order to prevent negative twisting, a chiral pitch was adjusted to approximately 60 micrometers by controlling the amount of a chiral material added to the liquid crystalline material.

Figure 9:
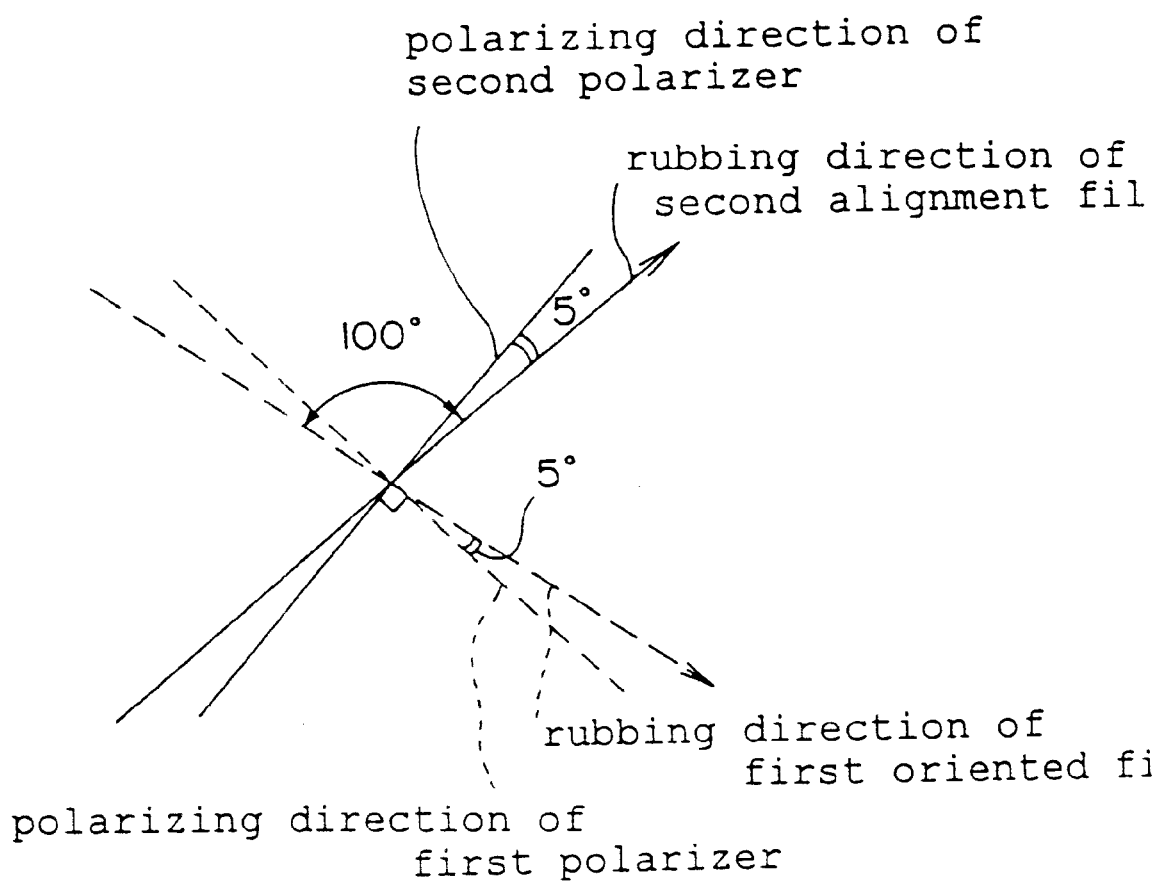
FIG. 9 is an illustration showing the relative relation between the direction of rubbing and the direction of optical axis of a polarizer in a liquid crystal display panel of the first embodiment of the present invention, obtained in Example 2.

In-order to ensure sufficient contrast, polarizers 6, 10 provided on the first and second substrates 1, 7, respectively, were so arranged that the directions of polarization thereof can make a right angle with each other. The direction of rubbing the first alignment film 5 and that of rubbing the second alignment film 9 relatively make an angle of 100°, so that the direction of polarization of each of the polarizers is fixed as shown in FIG. 9. Namely, the direction of rubbing the first alignment film 6 provided on the first substrate 1 was relatively shifted in 5° from the direction of polarization of the polarizer 6; the direction of rubbing the second alignment film 9 provided on the second substrate 7 was relatively shifted in 5° from the direction of polarization of the polarizer 10. Thereafter, the relationship between applied voltage and relative transmittance was examined.

Figure 10:
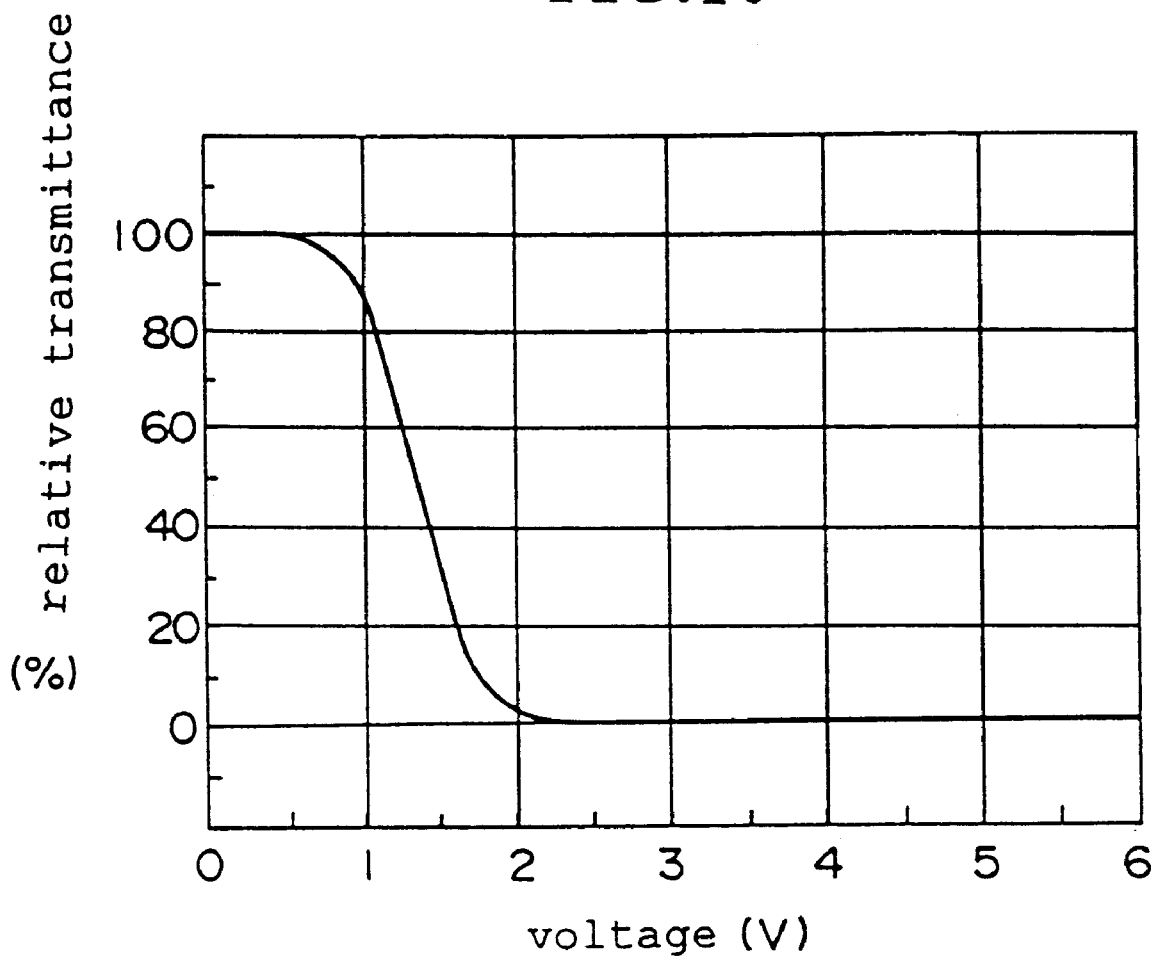
FIG. 10 is a graph showing the relationship between applied voltage and relative transmittance in a liquid crystal display panel of the first embodiment of the present invention, obtained in Example 2.

As a result, a characteristic curve as shown in FIG. 10 was obtained, and the saturation voltage $V_{sat}$ was found to be 2.25 V, which is lower than the saturation voltage $V_{sat}$ obtained in Example 1. It is considered that the following principle can be applied to this result:

One of the reasons why a high voltage is required to operate a liquid crystal display panel is such that liquid crystalline molecules existing at a position closest to the surface of the first and second alignment films 5,9, by which the liquid crystalline material is sandwiched, do not immediately change the tilt angle thereof even when voltage is applied. The twist angle of the liquid crystalline molecules is adjusted to 95 to 110°, and, at the same time, the relative angle of the polarizing axis of a pair of the polarizers 6, 10 is fixed to a value different from the twist angle of the liquid crystalline molecules. By this, incident light is to enter the liquid crystal display panel from the direction which is shifted from the direction of alignment of the liquid crystalline molecules. As a result, the effect of the liquid crystalline molecules which are late in response can be decreased.

By making the twist angle as wide as 95 to 110°, the saturation voltage becomes lower than 2.5 V, and the margin of voltage upon operation with 2.5 V becomes wider.

Next, a liquid crystal display panel according to a second embodiment of the present invention is described. Because there is not any constitutional difference between the conventional active element type liquid crystal display panel and the liquid crystal display panel according to the second embodiment, except for alignment films, alignment films according to the second embodiment and an alignment processing for the alignment films are mainly described.

Figure 11A:
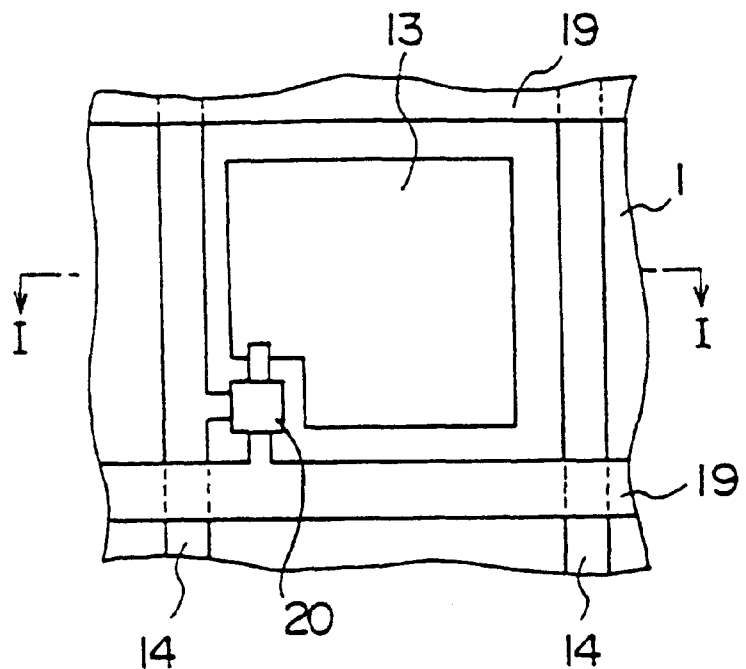
FIG. 11(a) is a plan view showing a pixel of a liquid crystal panel and an arrangement of bus lines.
Figure 11B:
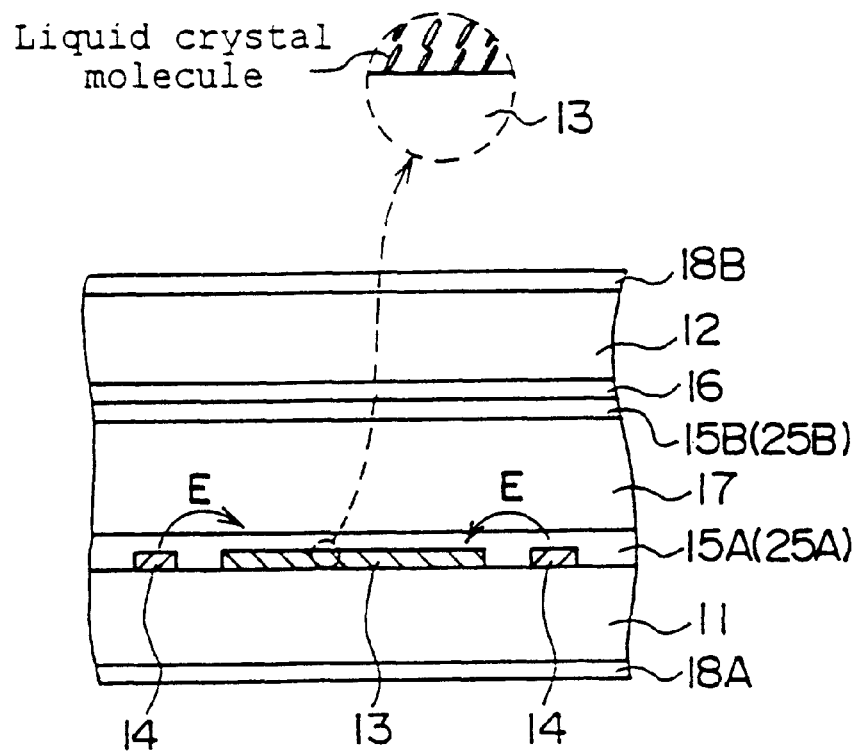
FIG. 11(b) is a cross sectional view taken generally along a line I—I of FIG. 11(a)

As shown in FIGS. 11(a) and 11(b), in a liquid crystal display panel according to the second embodiment, the plurality of scanning bus lines (or scanning wiring lines) 14 formed out of a metal such as Cr are spaced at first regular intervals on the first plane of the first transparent substrate 11, and the plurality of data bus lines (or data wiring lines) 19 are spaced at second regular intervals on the scanning bus lines 14 through an insulating film (not shown) to cross over the lines 14. The data bus lines 19 extend in a direction perpendicular to another direction in which the scanning bus lines 14 extend.

Each of the pixel electrodes 13 is arranged on a portion of the first transparent substrate 11 surrounded by one of the scanning bus lines 14 and one of the data bus lines 19. Therefore, the pixel electrodes 13 are arranged in matrix shape. Each of the pixel electrodes 13 is connected to one of the data bus lines 19 through the active element 20, and each of the active elements 20 is operated by a voltage applied from one of the scanning bus lines 14. A thin-film transistor (TFT) or a metal-insulator-metal (MIM) diode is used as the active element 20. In cases where the TFT is used, the scanning bus line 14 is sometimes called a gate bus line, and the data bus line 19 is sometimes called a drain bus line.

The scanning bus lines 14, the data bus lines 19, the active elements 20 and the pixel electrodes 13 are covered by a first alignment film 25A. As shown in FIGS. 12(a) to 12(d), a surface of the first alignment film 25A is rubbed with a rubbing role 21, so that an alignment processing is performed for the first alignment film 25A. In detail, the surface of the first alignment film 25A is rubbed with a piece of rubbing cloth 21a formed out of silk or rayon which is attached to a surface of the rubbing role 21. The first alignment film 25A is rubbed to orient main axes of a plurality of liquid crystal molecules placed on the film 25A toward the same axial direction.

Also, on a first plane of the second transparent substrate 12, the counter electrode (or transparent electrode) 16 and a second alignment film 25B are arranged in that order. In this case, it is applicable that a color filter be additionally arranged between the second alignment film 25B and the second transparent substrate 12. A surface of the second alignment film 25B is rubbed with the rubbing cloth 21a of the rubbing role 21, so that another alignment processing is performed for the second alignment film 25B.

The first transparent substrate 11 and the second transparent substrate 12 are arranged on condition that the rubbed surface of the first alignment film 25A face the rubbed surface of the second alignment film 25B, and the liquid crystal 17 is packed in a region between the first alignment film 25A and the second alignment film 25B. Therefore, the liquid crystal 17 are in contact with the rubbed surfaces of the first and second alignment films 25A and 25B. In addition, the polarizing plate 18A is arranged on a second plane of the first transparent substrate 11, and the polarizing plate 18B is arranged on a second plane of the second transparent substrate 12.

A manufacturing method of the liquid crystal display panel according to the second embodiment is described in brief.

The first alignment film 25A not rubbed is formed on the first transparent substrate 11, and the second alignment film 25B not rubbed is formed on the second transparent substrate 11. Thereafter, the surfaces of the first and second alignment films 25A and 25B are rubbed, the first and second alignment films 25A and 25B are arranged on condition that the rubbed surfaces of the films 25A and 25B face each other, and the liquid crystal 17 are packed in a region between the first and second alignment films 25A and 25B.

Next, the alignment processing performed for the first alignment film 25A and the alignment processing performed for the second alignment film 25B are described with reference to FIGS. 12(a) to 12(d). Because the films 25A and 25B are rubbed according to rubbing methods which differ from a conventional rubbing method, the inventors ascertain that the liquid crystal display panel according to the second embodiment can be operated by applying a lower voltage to the display panel.

Figure 12A:
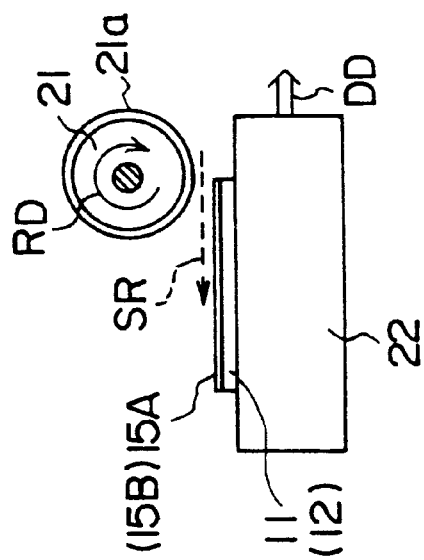
FIG. 12(a) and 12(c) are respectively an explanatory view showing a same-directional rubbing performed in second to fourth embodiments.
Figure 12B:
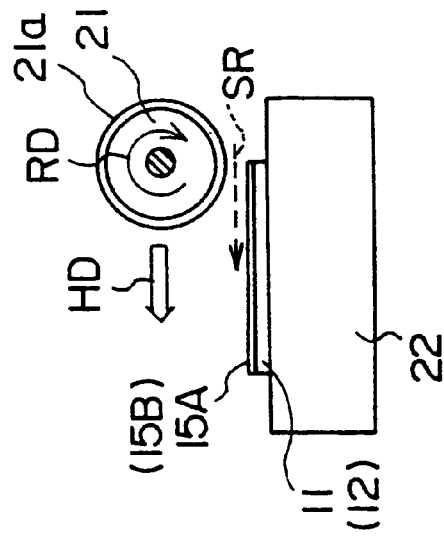
FIG. 12(b) and 12(d) are respectively an explanatory view showing an opposite-directional rubbing performed in the second embodiment.

FIGS. 12(a) and 12(b) show a first rubbing method according to the second embodiment of the present invention, and FIGS. 12(a) and 12(b) show a second rubbing method according to the second embodiment of the present invention.

As shown in FIGS. 12(a) to 12(d), in case of the rubbing of the first alignment film 25A, the first alignment film 25A formed on the first transparent substrate (or a glass substrate) 11 is placed on a stage 22, and the rubbing role 21 to which the rubbing cloth 21a formed out of rayon is attached. The rubbing role 21 formed in a cylindrical shape has a diameter of almost 15 cm, and a moving speed of the stage 22 which is equivalent to a moving speed of the first transparent substrate 11 is about several tens mm/sec. Also, in cases where the rubbing role 21 is moved in place of the stage 22, the moving speed of the rubbing role 21 is about several tens mm/sec.

When the first or second alignment film 25A or 25B is rubbed, the rubbing role 21 is rotated at a high speed of several hundreds rotations per minute by a driving mechanism (not shown), and a surface of the first or second alignment film 25A or 25B is rubbed with the rubbing cloth 21a. In this case, there are two types of rubbing methods.

In case of a first rubbing method, as shown in FIGS. 12(a) and 12(b), the rubbing role 21 is not moved over the stage 22, but the stage 22 placed under the rubbing role 21 is moved to rub a surface of the first or second alignment film 25A or 25B. In the first rubbing method, a moving direction of the transparent substrate 11 or 12 and the alignment film 25A or 25B is the same as that of the stage 22.

A rotational direction RD of the rubbing role 21 shown in FIG. 12(a) is set to make a rubbing direction SR of the rubbing role 21a on a surface of the alignment film 25A or 25B agree with a moving direction DD of the transparent substrate 11 or 12. A rubbing condition (or method) that the rubbing direction SR of the rubbing role 21 on the surface of the alignment film 25A or 25B set by the rotational direction RD of the rubbing role 21 agrees with a moving direction DD of the stage 22 (or the moving direction DD of the transparent substrate 11 or 12) is called a same-directional rubbing in this specification.

In contrast, a rotational direction RD of the rubbing role 21 shown in FIG. 12(b) is set to make a rubbing direction SR of the rubbing role 21a on a surface of the alignment film 25A or 25B be opposite to a moving direction DD of the transparent substrate 11 or 12. A rubbing condition (or method) that the rubbing direction SR of the rubbing role 21 on the surface of the alignment film 25A or 25B set by the rotational direction RD of the rubbing role 21 is opposite to a moving direction DD of the stage 22 (or the moving direction DD of the transparent substrate 11 or 12) is called an opposite-directional rubbing in this specification.

Figure 12C:
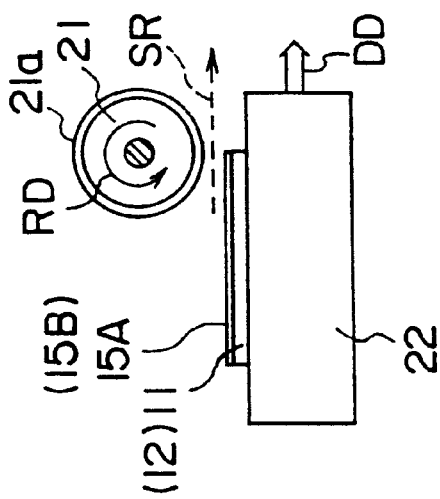
Figure 12D:
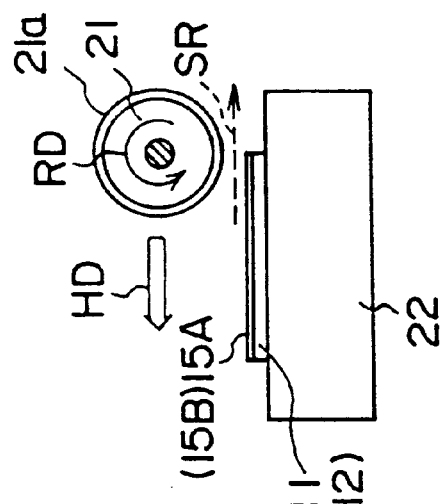

In case of a second rubbing method, as shown in FIGS. 12(c) and 12(d), the stage 22 is not moved, but the rubbing role 21 is moved in a moving direction HD over the stage 22 while rotating the rubbing role 21 on a surface of the alignment film 25A or 25B.

A rotational direction RD of the rubbing role 21 shown in FIG. 12(c) is set to make a rubbing direction SR of the rubbing role 21a on a surface of the alignment film 25A or 25B be opposite to the moving direction HD of the rubbing role 21. A rubbing condition shown in FIG. 12(c) is the same-directional rubbing because a relative moving relationship between the rubbing role 21 and the stage 22 is the same as that shown in FIG. 12(a).

In contrast, a rotational direction RD of the rubbing role 21 shown in FIG. 12(d) is set to make a rubbing direction SR of the rubbing role 21a on a surface of the alignment film 25A or 25B agree with the moving direction HD of the rubbing role 21. A rubbing condition shown in FIG. 12(d) is the opposite-directional rubbing because a relative moving relationship between the rubbing role 21 and the stage 22 is the same as that shown in FIG. 12(b).

In FIGS. 12(a) to 12(d), a direction of a relative movement between the rubbing role 21 and the stage 22 is perpendicular to a rotational axis of the rubbing role 21. However, the second embodiment is not limited to the rubbing methods shown in FIGS. 12(a) to 12(d). That is, as shown in FIGS. 13(a) and 13(b), even though a direction of a relative movement between the rubbing role 21 and the stage 22 is not perpendicular to the rotational axis of the rubbing role 21, the rubbing condition is judged to be the same-directional rubbing or the opposite-directional rubbing.

In detail, as shown in FIG. 13(a), in cases where a rubbing direction SR of the rubbing role 21a on a surface of the alignment film 25A or 25B set by the rotation of the rubbing roll 21 includes the same directional component as that of a moving direction of the stage 22, the rubbing condition is judged to be the same-directional rubbing. Also, as shown in FIG. 13(b), in cases where a rubbing direction SR of the rubbing role 21a on a surface of the alignment film 25A or 25B set by the rotation of the rubbing roll 21 includes a directional component opposite to that of a moving direction of the stage 22, the rubbing condition is judged to be the opposite-directional rubbing.

The inventors of the present invention examined a relationship between a potential difference between the counter electrode 16 and the pixel electrode 13 and a light transmittance for a first liquid crystal panel having the first alignment film 25A rubbed according to the same-directional rubbing and a second liquid crystal panel having the first alignment film 25A rubbed according to the opposite-directional rubbing. As a result, the inventors discovered that a saturation value (hereinafter, called a saturation voltage) of the voltage applied to the scanning bus lines 14, denoting a voltage value at which the light transmittance is saturated, in the first liquid crystal panel having the alignment film rubbed according to the same-directional rubbing differs from that in the second liquid crystal panel having the alignment film rubbed according to the opposite-directional rubbing.

Figure 14A:
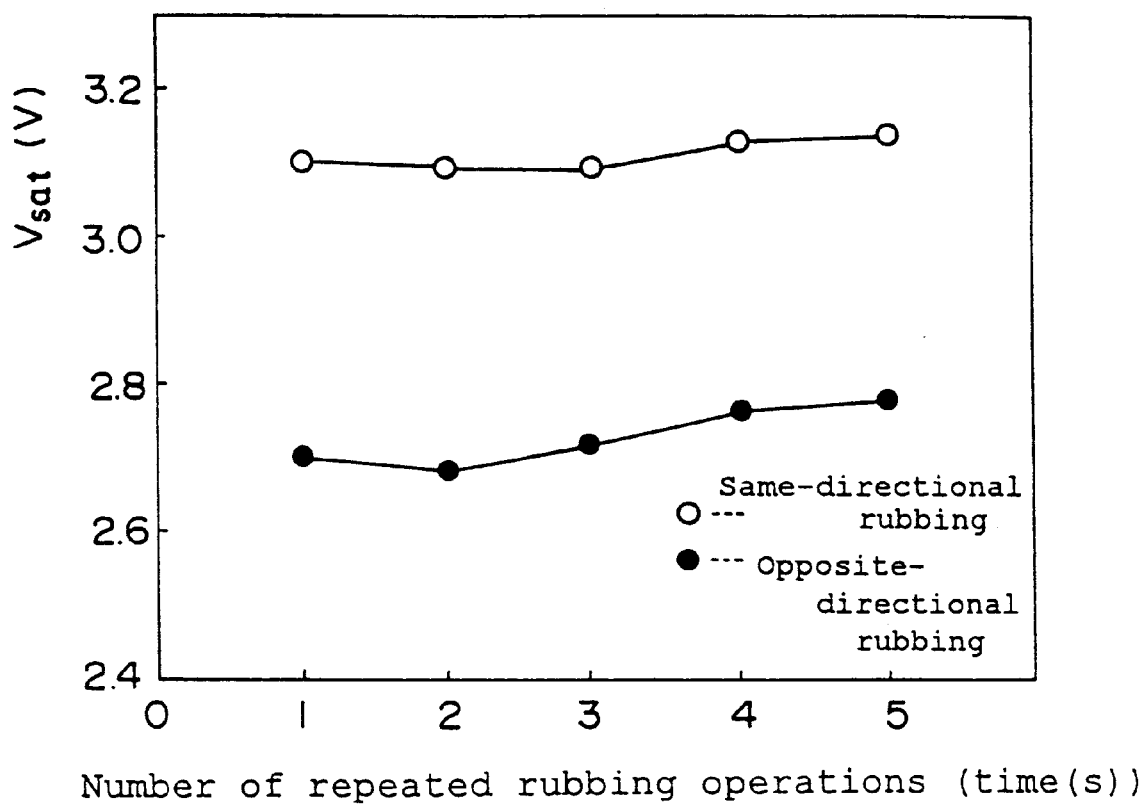
FIG. 14 shows a relationship between the number of rubbing operations performed according to the same-directional rubbing or the opposite-directional rubbing and a saturated voltage $V_{sat}$, according to the second embodiment of the present invention.

Experimental results indicating the difference in the saturation voltage between the first liquid crystal panel according to the same-directional rubbing and the second liquid crystal panel according to the opposite-directional rubbing are described. The saturation voltage $V_{sat}$ is defined as a voltage value at which the light transmittance is 1% on condition that the light transmittance is set to 100% when any voltage is not applied to the scanning bus lines 14 of the crystal panel (a normal white display). FIG. 14 shows experimental results obtained by examining the relationship between the number of rubbing operations and the saturated voltage $V_{sat}$ for the first and second liquid crystal display panels. In this case, polyimide called a trade name "AL1054" and manufactured in Nippon Goseigomu (synthetic rubber) Corp. is used as a material of the first and second alignment films 25A and 25B. Also, the configurations of the first and second liquid crystal display panels are the same as the liquid crystal display panel shown in FIG. 11 according to the second embodiment. Also, the liquid crystal 17 includes fluorine (F) as a polar group, a dielectric constant $\in_1$ of the liquid crystal in a direction of its major axis is 12.5, and a dielectric constant $\in_2$ of the liquid crystal in a direction of its minor axis is 3.8.

As shown in FIG. 14, the saturation voltage $V_{sat}$ in the first liquid crystal display panel having the first alignment film 25A rubbed according to the same-directional rubbing is about 3.1 V on average. In contrast, the saturation voltage $V_{sat}$ in the second liquid crystal display panel having the first alignment film 25A rubbed according to the opposite-directional rubbing is about 2.7 V on average and is about 0.4 V lower than that in the first liquid crystal display panel. Therefore, it is ascertained that the saturation voltage $V_{sat}$ in the display panel according to the opposite-directional rubbing is lowered as compared with that in the display panel according to the same-directional rubbing.

To examine the reason of the difference in the saturation voltage $V_{sat}$, a difference in an inclined angle of a liquid crystal molecule placed just on the rubbed surface of the alignment film 25A or 25B when any voltage is not applied, in other words a difference in a so-called pre-tilt angle, is examined. However, the pre-tilt angle of the liquid crystal molecule in the second display panel according to the opposite-directional rubbing is almost the same as that in the first display panel according to the same-directional rubbing.

Therefore, a difference between an anchoring energy of liquid crystal molecules placed on the first display panel according to the same-directional rubbing and another anchoring energy of liquid crystal molecules placed on the second display panel according to the opposite-directional rubbing is examine. An anchoring energy for the second liquid crystal display panel (the opposite-directional rubbing) is on the order of $10^{-4}$ J/m$^2$, and an anchoring energy for the first liquid crystal display panel (the same-directional rubbing) is on the order of $10^{-3}$ J/m$^2$. Therefore, it is ascertained that the difference of one figure in the anchoring energy exists between the second liquid crystal display panel (the opposite-directional rubbing) and the first liquid crystal display panel (the same-directional rubbing). In this case, the measurement of the anchoring energy is performed by referring a method disclosed in "H. Yokoyama et al., J. Appl. Phys. 61(9), May 1 1987, pp.4501–4518".

Therefore, in cases where the alignment film 25A or 25B is rubbed according to the same-directional rubbing, the anchoring energy of the liquid crystal molecules placed on the alignment film 25A or 25B becomes high, and liquid crystal molecules placed in the neighborhood of the rubbed surface of the alignment film 25A or 25B slowly rise when an voltage is applied to the alignment film 25A or 25B. As a result, the saturated energy in the first display panel according to the same-directional rubbing becomes high.

Also, the same-directional rubbing and the opposite-directional rubbing are alternately performed for the alignment film 25A or 25B to repeatedly rub the alignment film 25A or 25B, and it is examined which rubbing condition influences on the alignment film 25A or 25B. A relationship between the number of rubbing operations and the saturation voltage $V_{sat}$ obtained as a result of the examination is shown in FIG. 15.

Figure 15:
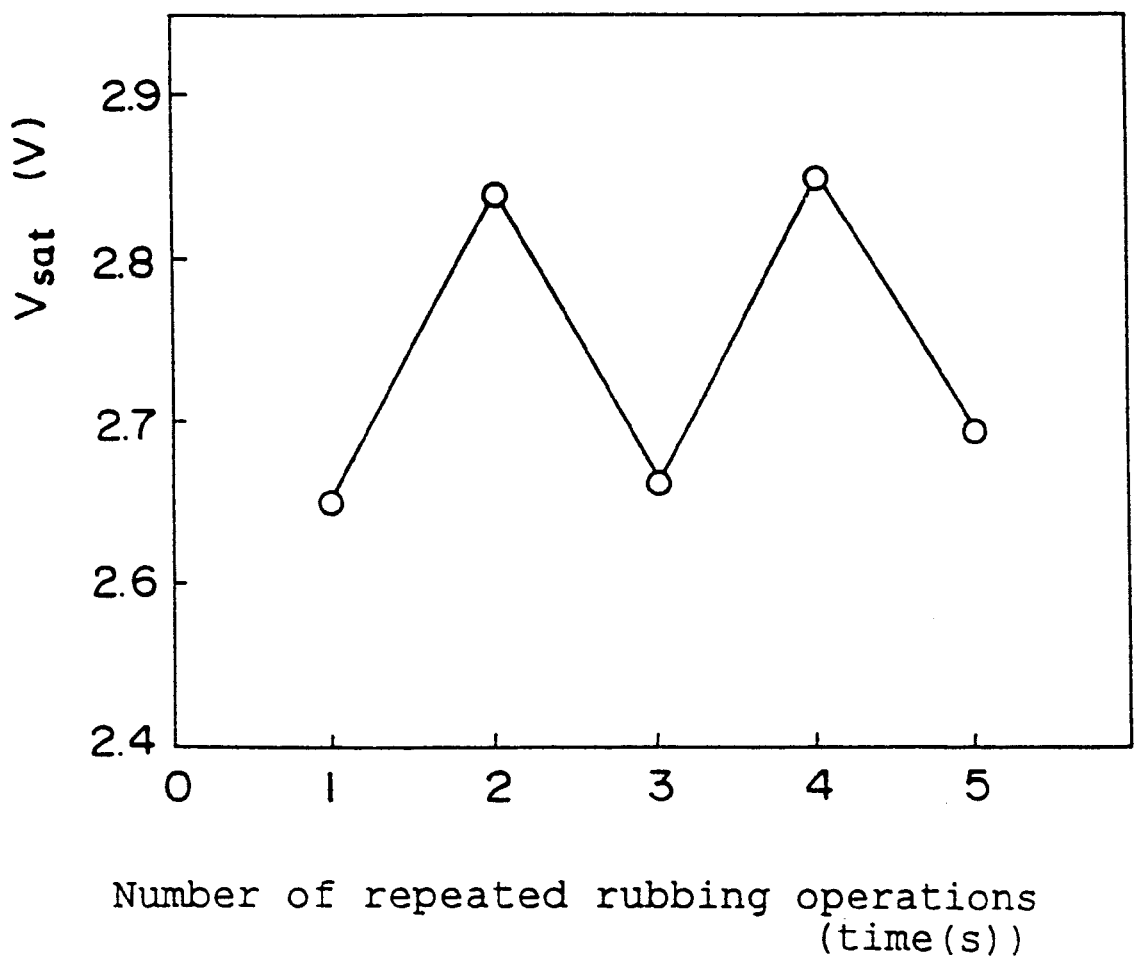
FIG. 15 shows a relationship between a saturation voltage $V_{sat}$ and the number of rubbing operations in which the same-directional rubbing and the opposite-directional rubbing are alternately performed, according to the second embodiment of the present invention.

As shown in FIG. 15, the opposite-directional rubbing is first performed, and the same-directional rubbing, the opposite-directional rubbing, the same-directional rubbing and the opposite-directional rubbing are repeatedly performed in that order. That is, the rubbing condition performed in an odd-numbered repeated rubbing is the opposite-directional rubbing, and the rubbing condition performed in an even-numbered repeated rubbing is the same-directional rubbing. The saturation voltage $V_{sat}$ changes each time the rubbing operation is performed.

By comparing the FIGS. 14 and 15 with each other, the saturation voltage $V_{sat}$ in the odd-numbered repeated rubbing is almost the same as that in the opposite-directional rubbing shown in FIG. 14, and the saturation voltage $V_{sat}$ in the even-numbered repeated rubbing is almost the same as that in the same-directional rubbing shown in FIG. 14. Therefore, it is ascertained that the saturation voltage $V_{sat}$ in the display panel is determined by the rubbing condition finally performed for the alignment film 25A or 25B. Therefore, the judgement whether the rubbing condition performed for the alignment film 25A or 25B is the same-directional rubbing or the opposite-directional rubbing is performed by considering only the rubbing operation finally performed.

As is described above, to operate the liquid crystal display panel by applying a low voltage to the display panel, it is effective that the anchoring energy for the alignment film 25A or 25B is made small by finally performing the opposite-directional rubbing, as well as the improvement of the liquid crystal material.

However, in cases where the opposite-directional rubbing is performed over the entire surface of an alignment film, there is a case that the arrangement of liquid crystal molecules placed in the neighborhood of a peripheral portion of the pixel electrode 13 in the liquid crystal display panel is put out of order. For example, in case of an active device type liquid crystal display panel, because a high negative voltage is applied to the scanning bus lines 14 respectively arranged between a pair of pixel electrodes 13, a potential difference occurs between each of the scanning bus lines 14 and each of the pixel electrodes 13, and an electric field E having a component parallel to the surface of the alignment film 25A is generated for each of the scanning bus lines 14 (refer to FIG. 11(b)). Therefore, a peculiar region of the first alignment film 25A on which a pre-tilt angle of each of liquid crystal molecules becomes too large or too small is locally generated just above a peripheral portion of each of the scanning bus lines 14 because of the generation of the electric field E. Because a saturation voltage $V_{sat}$ in each of the peculiar regions differs from those in other regions, an image is displayed on the active device type liquid crystal display panel in disturbed condition, and the active device type liquid crystal display panel cannot be operated by applying a low voltage to the display panel.

Figure 16:
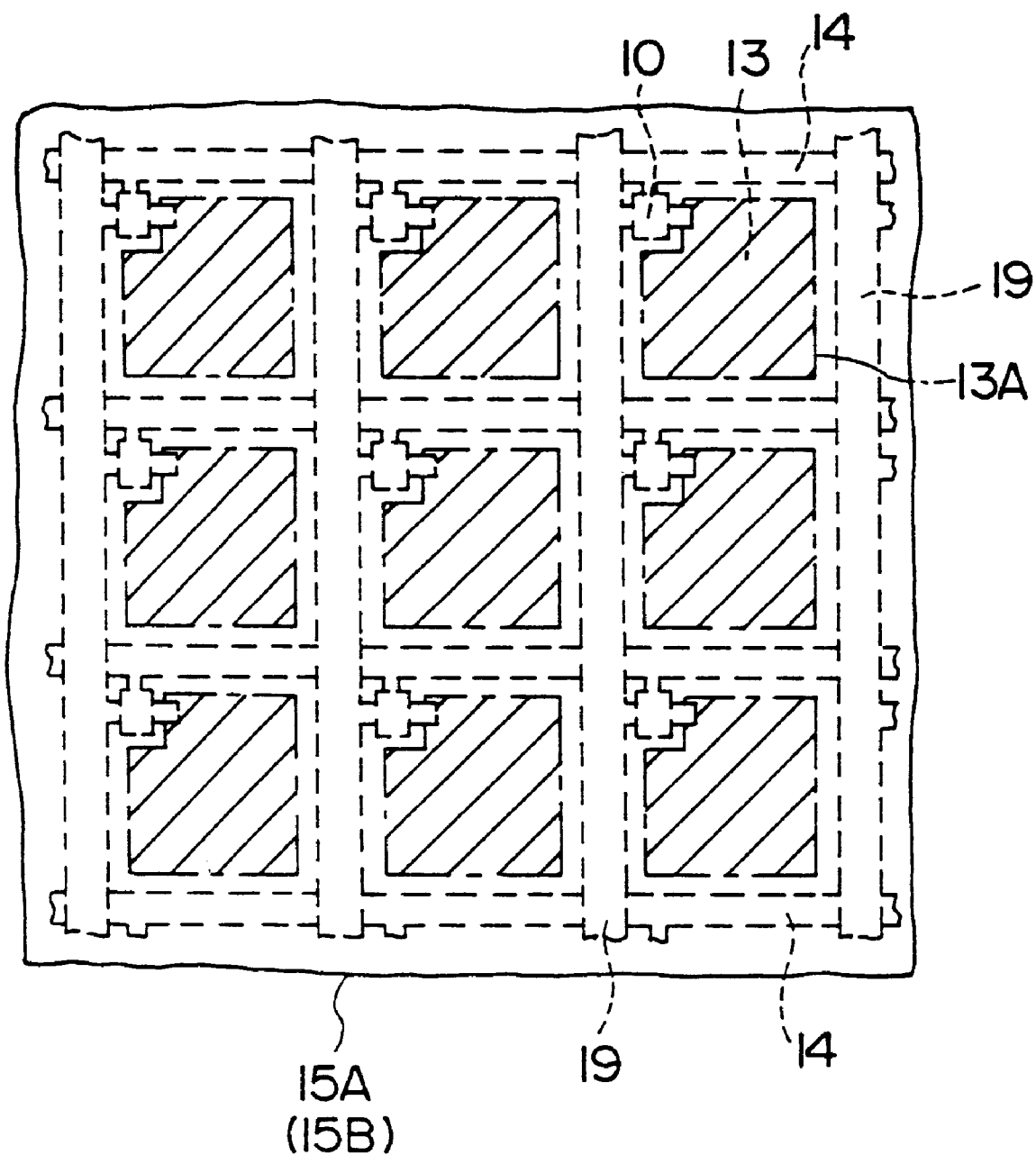
FIG. 16 is a plan view of a liquid crystal panel in which regions rubbed according to the same-directional rubbing and the other regions rubbed according to the opposite-directional rubbing are shown according to a first example of the second embodiment.

To solve the above problem, as shown in FIG. 16, portions of the first alignment film 25A arranged in pixel regions 13A are rubbed according to the opposite-directional rubbing, and the other portions of the first alignment film 25A arranged out of the pixel regions 13A are rubbed according to the same-directional rubbing. Each of the pixel regions 13A is defined as a region placed just over one of the pixel electrodes 13. Each of shadowed portions surrounded by a dot-dash-line in FIG. 16 denotes one of the pixel regions 13A.

Therefore, the anchoring energy in the portions of the first alignment film 25A placed just over the pixel electrodes 13 is made small, the anchoring energy in the other portions of the first alignment film 25A which are not placed on any pixel electrode 13 and are placed in the neighborhood of the bus lines 14 and 19 is made large, and the generation of the peculiar regions can be prevented. In the same manner, portions of the second alignment film 25B placed just above the pixel electrodes 13 are rubbed according to the opposite-directional rubbing, and the other portions of the second alignment film 25B not placed above any pixel electrode 13 are rubbed according to the same-directional rubbing.

Accordingly, because the anchoring energy in the portions of the alignment films 25A and 25B placed in the neighborhood of the bus lines 14 and 19 and not placed in any pixel region 13A is made large, liquid crystal molecules in the neighborhood of the bus lines 14 and 19 are not influenced by the electric field E, and the liquid crystal molecules can be reliably oriented toward the same direction and can reliably have the same pre-tilt angle.

In this embodiment, the second alignment film 25B is rubbed according to the opposite-directional rubbing and the same-directional rubbing in the same manner as the first alignment film 25A. However, because the influence of the electric field E on the second alignment film 25 is small, it is applicable that all surface of the second alignment film 25B is rubbed according to the opposite-directional rubbing.

A rubbing method in which the portions of the alignment films 25A and 25B are rubbed according to the opposite-directional rubbing and the other portions of the alignment films 25A and 25B are rubbed according to the same-directional rubbing is described with reference to FIGS. 17(a) and 17(b).

Figure 17A:
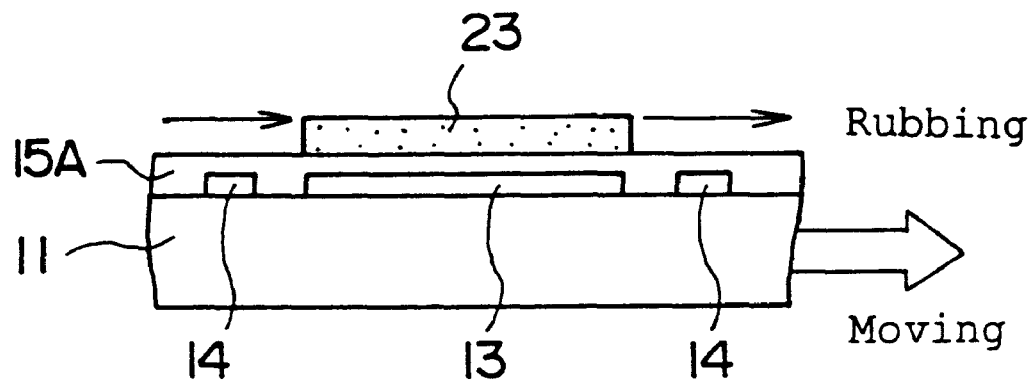
FIGS. 17(a) and 17(b) are cross sectional views showing a rubbing method in which portions of an alignment film are rubbed according to the opposite-directional rubbing and the other portions of the alignment film are rubbed according to the same-directional rubbing.
Figure 17B:
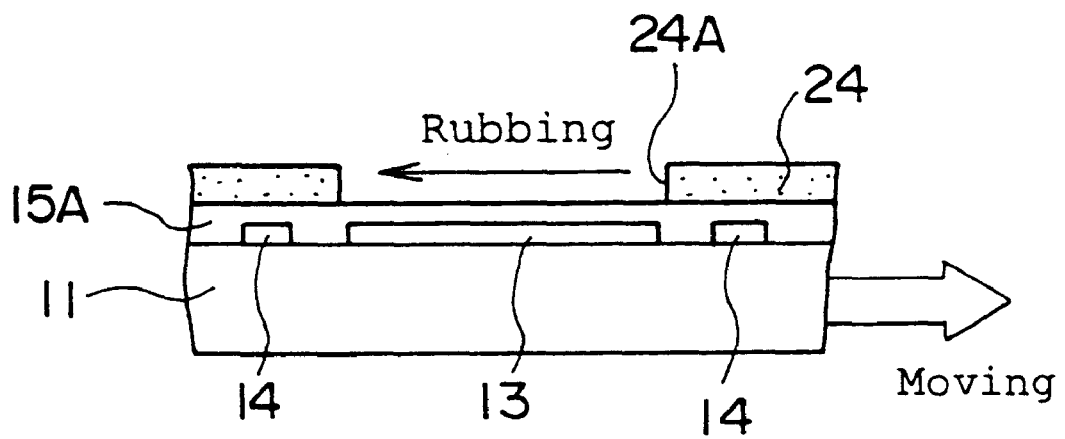

As shown in FIG. 17(a), portions of the first alignment film 25A placed just over the pixel electrode 13 are covered with a plurality of first resist masks 23, the other portions of the first alignment film 25A not covered with any first resist mask 23 are rubbed according to the same-directional rubbing, and the first resist masks 23 are removed. Thereafter, as shown in FIG. 17(b), the other portions of the first alignment film 25A are covered with a second resist mask 24 having a plurality of windows 24A placed just over the pixel electrodes 13, the other portions of the first alignment film 25A are rubbed through the windows 24A according to the opposite-directional rubbing, and the second resist mask 24 are removed. Therefore, a plurality of first rubbing regions relating to the opposite-directional rubbing and a plurality of second rubbing regions relating to the same-directional rubbing are formed on the surface of the first alignment film 25A.

Next, a plurality of examples of the liquid crystal display panel manufactured according to the above-described technique are described in detail.

(First Example)

As shown in FIGS. 11(a) and 16, the first transparent substrate 11 on which the plurality of pixel electrodes 13 are longitudinally and latitudinally arranged to form a plurality of pixels of 600×400 is used, and a normally white mode of liquid crystal display panel of which the cross sectional structure is shown in FIG. 11(b) is manufactured. In this case, a TFT is used as each of the active elements 20.

Each of the pixel electrodes 13 has a size of about 150×150 $\mu m^2$, and a distance between the pixel electrode 13 and the scanning bus line 14 (or the data bus line 19) is about 10 $\mu m$. As a material of the liquid crystal 17, a liquid crystal having fluorine (F) on its end portion is used. Polyimide called a trade name "AL1054" manufactured in Nippon Goseigomu (synthetic rubber) Corp. is used as materials of the first and second alignment films 25A and 25B. The first and second alignment films 25A and 25B are formed by spin-coating the polyimide on the first and second transparent substrates 11 and 12.

The rubbing operation for the first alignment film 25A placed on the first transparent substrate 11 with the TFT 20 is performed as follows.

The rubbing operation is performed according to the method shown in FIGS. 12(a) and 12(b), and the rubbing role 21 of which a surface is covered with the rayon cloth 21a is used. As a condition of the rubbing operation, a pushing degree of the rayon cloth 21a in the first alignment film 25A is set to 0.3 mm, the number of repeated rubbing operations is set to five, a moving speed of the first transparent substrate 11 is set to 350 mm/sec, and a rotational speed of the rubbing role 21 is set to 300 rpm. Thereafter, the portions of the first alignment film 25A placed in the pixel regions 13A are repeatedly rubbed five times according to the opposite-directional rubbing shown in FIG. 12(b), and the other portions of the first alignment film 25A not placed in any pixel region 13A are repeatedly rubbed five times according to the same-directional rubbing shown in FIG. 12(a).

Also, the rubbing operation is performed for the second alignment film 25B placed on the second transparent substrate 12, on which any TFT is not arranged, on the same condition. The portions of the second alignment film 25B placed just above the pixel electrodes 13 are repeatedly rubbed five times according to the opposite-directional rubbing shown in FIG. 12(b), and the other portions of the second alignment film 25B not placed above any pixel electrode 13 are repeatedly rubbed five times according to the same-directional rubbing shown in FIG. 12(a).

Thereafter, the saturation voltage $V_{sat}$ of the liquid crystal display panel manufactured as the first example is examined. Also, a defective ratio R of pixels in the display panel is examined. In cases where one or more liquid crystal molecules placed just above a pixel (or a pixel electrode 13) or placed in the neighborhood of the pixel abnormally rise on the alignment film 25A or 25B, it is judged that the pixel is defective. A result of the examination for the first example is shown in Table 1.

In Table 1, the saturation voltage $V_{sat}$ in the normally white mode of liquid crystal display panel is defined as a voltage at which the light transmittance is 1% on condition that the light transmittance is set to 100% when a potential difference between the pixel electrode 13 and the counter electrode 16 is zero. Also, the defective ration R is expressed by the number of pixels judged to be defective among 500 pixels.

Also, a first liquid crystal display panel (not shown) having the first alignment film 25A of which all surface is rubbed according to the same-directional rubbing is manufactured as a first comparing sample, and a second liquid crystal display panel (not shown) having the first alignment film 25A of which all surface is rubbed according to the opposite-directional rubbing is manufactured as a second comparing sample. Thereafter, the saturation voltage $V_{sat}$ and the defective ration R of the pixels are examined for the first and second liquid crystal display panels. Results of the examination for the first and second comparing samples are also shown in Table 1. The configurations of the first and second liquid crystal display panels are the same as that of the liquid crystal display panel manufactured as the first example, except for the rubbing direction of the first alignment film 25A.

TABLE 1

|  | first example | first comparing sample | second comparing sample |
|---|---|---|---|
| $V_{sat}$ | 2.75 V | 3.16 V | 2.72 V |
| R | 0 | 0 | 120 |

As is apparent in Table 1, in case of the first liquid crystal display panel (the first comparing sample), though the defective ratio R of the pixels is zero, the saturation voltage $V_{sat}$ is not lowered. Also, in case of the second liquid crystal display panel (the second comparing sample), though the saturation voltage $V_{sat}$ is lowered, the defective ratio R of the pixels is high. In contrast, in case of the liquid crystal display panel manufactured as the first example, the defective ratio R of the pixels is zero, and the saturation voltage $V_{sat}$ is lowered. Therefore, a merit that the saturation voltage $V_{sat}$ is lowered by the opposite-directional rubbing and another merit that the orientation of the liquid crystal molecules is stabilized by the same-directional rubbing can be obtained in the liquid crystal display panel according to the second embodiment.

(Second Example)

A distance between each of the pixel electrodes 13 (or pixels) and each of the bus lines 14 and 19 in the liquid crystal display panel manufactured as the first example is shortened to 5 μm in a second example. In this case, the defective ratio R of the pixels is undesirably increased to about 250.

Figure 18A:
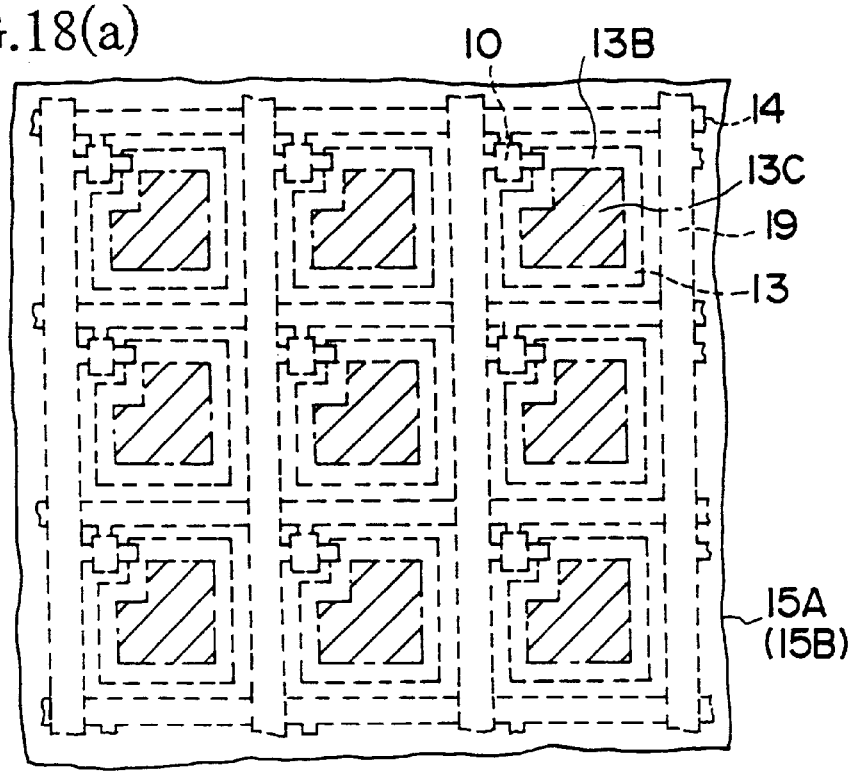
FIG. 18(a) is a plan view of a liquid crystal panel in which regions rubbed according to the same-directional rubbing and the other regions rubbed according to the opposite-directional rubbing are shown according to a second example of the second embodiment.

Therefore, as shown in FIG. 18(a), a peripheral portion of each pixel region 13A which is placed in a range from a boundary line of a pixel region 13A to an inside line placed inward from the boundary line of the pixel region 13A by 10 μm is defined as a frame-shaped region 13B of the first alignment film 25A, and a central portion of each pixel region 13A which is placed inside of the frame-shaped region 13B is defined as an inside region 13C of the first alignment film 25A. The inside regions 13C of the first alignment film 25A are denoted by shadowed portions shown in FIG. 18(a). The frame-shaped regions 13B of the first alignment film 25A are rubbed according to the same-directional rubbing as well as the other portions of the first alignment film 25A not placed over any pixel electrode 13, and the inside regions 13C of the first alignment film 25A are selectively rubbed according to the opposite-directional rubbing. In the same manner, inside regions of the second alignment film 25B narrower than the portions of the second alignment film 25B arranged just above the pixel electrodes 13 are defined, frame-shaped regions of the second alignment film 25B surrounding the inside regions of the second alignment film 25 are defined, the frame-shaped regions of the second alignment film 25B are rubbed according to the same-directional rubbing as well as the other portions of the second alignment film 25B not placed above any pixel electrode 13, and the inside regions of the second alignment film 25B are selectively rubbed according to the opposite-directional rubbing. As a result, a liquid crystal display panel is manufactured as a second example.

The defective ratio R of the pixels in the second example is reduced to zero. In this case, the saturation voltage $V_{sat}$ is 2.8 V. The reason that the defective ratio R is reduced is as follows.

When the anchoring energy in the frame-shaped regions 13B of the first alignment film 25A which are placed in the neighborhood of the bus lines 14 and 19 is large, it becomes difficult to change the pre-tilt angle of liquid crystal molecules placed on the frame-shaped regions 13B of the first alignment film 25A even though the electric field E caused by the bus lines 14 and 19 influences on the liquid crystal molecules. Therefore, the orientation of the major axes of the liquid crystal molecules is not disturbed by the electric field E.

(Third Example)

A distance between each of the pixel electrodes 13 (or pixels) and each of the bus lines 14 and 19 in the liquid crystal display panel manufactured as the first example is shortened to 8 μm in a third example. In this case, the defective ratio R of the pixels is increased to about 60.

Therefore, the first alignment film 25A placed on the first transparent substrate 11 on which the TFT 20 is arranged is rubbed according to the same-directional rubbing and the opposite-directional rubbing, in the same manner as in the second example. In contrast, all surface of the second alignment film 25B placed on the second transparent substrate 12 on which any TFT is not arranged is rubbed according to the opposite-directional rubbing. As a result, a liquid crystal display panel is manufactured as a third example.

The defective ratio R of the pixels in the third example is reduced to zero. In this case, the saturation voltage $V_{sat}$ is 2.8 V. The reason that the defective ratio R is reduced is that a strength of the electric field E caused by a potential difference between the pixel electrode 13 and the bus lines 14 and 19 is low on the surface of the second alignment film 25B.

(Fourth Example)

A difference between the liquid crystal display panel manufactured as the first example and a liquid crystal display panel manufactured as a fourth example is that the number of rubbing operations is changed in the fourth example.

That is, the rubbing operations are performed twice for the portions of the first and second alignment films 25A and 25B according to the opposite-directional rubbing, and the rubbing operations are repeatedly performed five times for the other portions of the first and second alignment films 25A and 25B according to the same-directional rubbing. In this case, the other rubbing conditions such as the pushing degree of the rayon cloth 21a in the alignment films 25A and 25B, the moving speed of the transparent substrates 11 and 12 and the rotational speed of the rubbing role 21 are the same as those in the first example. As a result, a liquid crystal display panel is manufactured as a fourth example.

The defective ratio R of the pixels in the third example is reduced to zero. In this case, the saturation voltage $V_{sat}$ is reduced to 2.71 V which is lower than that in the first example.

The same effect is obtained by changing the pushing degree of the rayon cloth 21a in the alignment films 25A and 25B, the moving speed of the transparent substrates 11 and 12 or the rotational speed of the rubbing role 21.

Also, following conditions can be selected to lower the anchoring energy for the purpose of lowering the saturation energy, as well as the selection of the same-directional rubbing and the opposite-directional rubbing. That is, when at least one of selective conditions such as the decrease of the pushing degree of the rayon cloth 21a, the decrease of the moving speed of the transparent substrates 11 and 12 and the decrease of the rotational speed of the rubbing role 21 is adopted, the display panel can be operated by applying a low voltage to the display panel. Also, in cases where at least one of the selective conditions is additionally adopted when the alignment film 25A or 25B is rubbed according to the opposite-directional rubbing, the anchoring energy for the alignment film 25A or 25B can be more over lowered, and the display panel can be operated by applying a lower voltage to the display panel.

(Fifth Example)

In the second and third examples, as shown in FIG. 18(a), the liquid crystal molecules being prevented from abnormally rising on the first alignment film 25A because of the electric field E by rubbing the frame-shaped regions 13B of the first alignment film 25A according to the same-directional rubbing. In this case, the electric field E influencing the liquid crystal molecules placed on the frame-shaped regions 13B of the first alignment film 25A is not generated so much by a potential difference between the data bus line 19 and the pixel electrode 13 but is mainly generated by a potential difference between the scanning (or gate) bus line 14 and the pixel electrode 13.

Figure 18B:
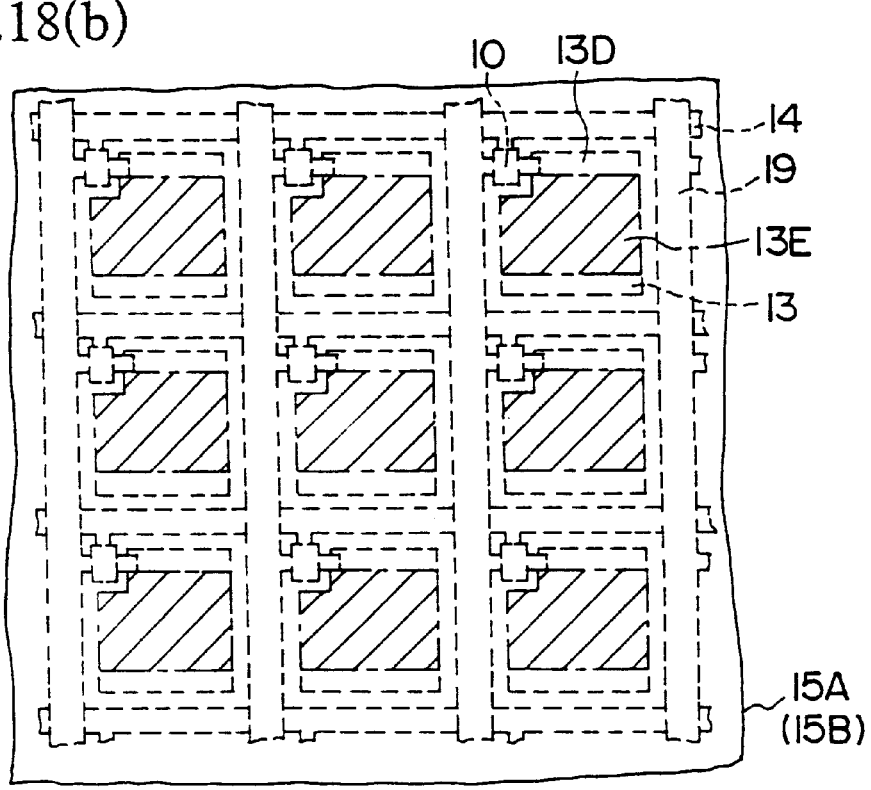
FIG. 18(b) is a plan view of a liquid crystal panel in which regions rubbed according to the same-directional rubbing and the other regions rubbed according to the opposite-directional rubbing are shown according to a fifth example of the second embodiment.

Therefore, as shown in FIG. 18(b), two peripheral portions of each pixel region 13A placed in the neighborhood of the gate bus line 14 are defined as gate-side regions 13D, and the gate-side regions 13D of the first alignment film 25A are rubbed according to the same-directional rubbing. Also, a plurality of central regions 13E of the first alignment film 25A respectively placed between the two gate-side regions 13D are rubbed according to the opposite-directional rubbing. As a result, a liquid crystal display panel is manufactured as a fifth example.

In this case, the defective ratio R and the saturation voltage $V_{sat}$ are the same as those in the second and third examples, and the same effect can be obtained.

In the second embodiment, an active element type twisted nematic (TN) liquid crystal display panel is used as the liquid crystal display panel. However, even though another type TN liquid crystal display panel is used, the same effect can be obtained.

Next, a third embodiment is described.

In the above first embodiment of the present invention, a direction for rubbing the surfaces of the alignment films 25A and 25B is the same as or opposite to a moving direction of the alignment film 25A or 25B, and the saturation voltage $V_{sat}$ in the display panel according to the second embodiment is lowered as compared with that in a conventional display panel.

The reason that the saturation voltage $V_{sat}$ is lowered is that the energy in the alignment film 25A or 25B is lowered. Therefore, the inventors tried to change the anchoring energy in the alignment film 25A or 25 by using orientation methods other than the change of the rubbing condition. As the orientation methods, three orientation methods are known.

First, an orientation method for orienting liquid crystal molecules on an alignment film toward the same direction by forming a plurality of grooves in the alignment film is disclosed in a literature "SID DIGEST 93 DIGEST, 1993, pp.957–960".

Secondly, an orientation method for orienting liquid crystal molecules on an alignment film toward the same direction by radiating electromagnetic wave to the alignment film is disclosed in a literature "Martin SCHADT et al., Japan, J. Apply. Phys. Vol.31, 1992, pp.2155–2164".

Thirdly, an orientation method for orienting liquid crystal molecules on an alignment film toward the same direction by using a Langnuir-Blodgett (LB) film as the alignment film is disclosed in a literature "Makoto MURATA et al., Japan, J. Apply. Phys. Vol.31, 1992, pp.L189–L192". The direction of the orientation is set to an extension direction of the LB film.

The decrease of the anchoring energy in the alignment film according to each of the orientation methods is examined by the inventors. That is, the anchoring energy of the order of $10^{-5}$ to $10^{-4}$ J/m$^2$ is observed, as is described in the literature. Therefore, it is apparent that the anchoring energy in the alignment film according to each of the orientation methods is lowered by one or more figures as compared with the change of the rubbing condition. In this case, the measuring method of the anchoring energy is the same as that adopted in the second embodiment.

In cases where the alignment films 25A and 25B of the active element type liquid crystal display panel shown in FIGS. 11(a) and 11(b) are processed according to one of the three orientation methods, an orientation defective region is generated on the alignment films 25A and 25B. The reason of the generation of the orientation defective region is as follows. In cases where the anchoring energy of a portion of the alignment film 25A or 25B placed in the neighborhood of the scanning bus line 14 or the data bus line 19 is low, a plurality of liquid crystal molecules placed on the portion of the alignment film 25A or 25B rise up in various directions in disorder because of a component of the electric field E extending from the bus line 14 or 19 in a lateral direction, and a so-called reverse tilt region equivalent to the orientation defective region is generated on the portion of the alignment film 25A or 25B placed in the neighborhood of the bus line 14 or 19. The electric field E is generated by a potential difference between the bus line 14 or 19 and each pixel electrode 13 as is described in the second embodiment.

To prevent the generation of the reverse tilt region, it is effective that the anchoring energy in portions of the alignment films 25A and 25B placed just over the pixel electrodes 13 is lowered and the anchoring energy in other portions of the alignment films 25A and 25B placed just over the bus lines 14 and 19 or placed in the neighborhood of the bus lines 14 and 19 is heightened.

Therefore, after the alignment films 25A and 25B of the liquid crystal display panel shown in FIGS. 11(a) and 11(b) are processed according to one of the three orientation methods, the portions of the alignment films 25A and 25B placed just over the pixel electrodes 13 are covered with resist masks, and the other portions of the alignment films 25A and 25B not covered with any resist mask are rubbed, for example, according to the same-directional rubbing described in the second embodiment. Therefore, the anchoring energy of other portions of the alignment films 25A and 25B is heightened.

In the third embodiment, both the alignment films 25A and 25B are processed according to one of the three orientation methods. However, because the reverse tilt region caused by the electric field E is not generated so much on the second alignment film 25B placed on the second transparent substrate 12 on which any active element is not arranged but is mainly generated on the first alignment,film 25A placed on the first transparent substrate 11 on which the active element 20 arranged, it is applicable that only the second alignment film 25B be processed according to one of the three orientation methods. In this case, though the voltage applied to the scanning bus lines 14 of the liquid crystal panel for the purpose of operating the display panel is heightened a little, it is sufficient to prevent the generation of the reverse tilt region.

Also, it is preferred that the pre-tilt angle of liquid crystal molecules placed on portions of the alignment film 25A or 25B which are not arranged on any pixel electrode 13 be large. As a first reason, because the pre-tilt angle of liquid crystal molecules which are placed on the portions of the alignment films 25A and 25B processed according to one of the orientation methods is almost zero and small, when the pre-tilt angle of liquid crystal molecules which are placed on the other portions of the alignment films 25A and 25B not arranged on any pixel electrode 13 is enlarged, an average pre-tilt angle of the liquid crystal molecules placed on all surface of the alignment film 25A or 25B can be increased to a value more than zero. As a second reason, the larger the pre-tilt angle of the liquid crystal molecules on the alignment film 25A or 25B, the more effectively the generation of the reverse tilt region is prevented.

Accordingly, it is required to set the pre-tilt angle of the liquid crystal molecules placed on portions of the alignment film 25A or 25B which are not arranged on any pixel electrode 13 to 5 degrees or more, or preferably 10 degrees or more, by selecting the rubbing condition. In general, a pre-tilt angle of liquid crystal molecules ranges from 2 to 3 degrees.

Next, the adjustment of the anchoring energy is more concretely described.

(First Example)

In this first example, a normally white mode type liquid crystal display panel is used. The configuration of the display panel is the same as that manufactured according to the first example of the second embodiment, except for the alignment films 25A and 25B. A liquid crystal having fluorine (F) on its end portion is used as the liquid crystal 17. Therefore, a fundamental configuration of the display panel is the same as that shown in FIGS. 11(a) and 11(b).

As a material composing the alignment films 25A and 25B, a resin which is called RN1046 (trade name) manufactured by Nissan Kagaku (or chemistry) Corp. is used in the first example. The resin is spin-coated, heated and formed in a film shape.

Figure 19:
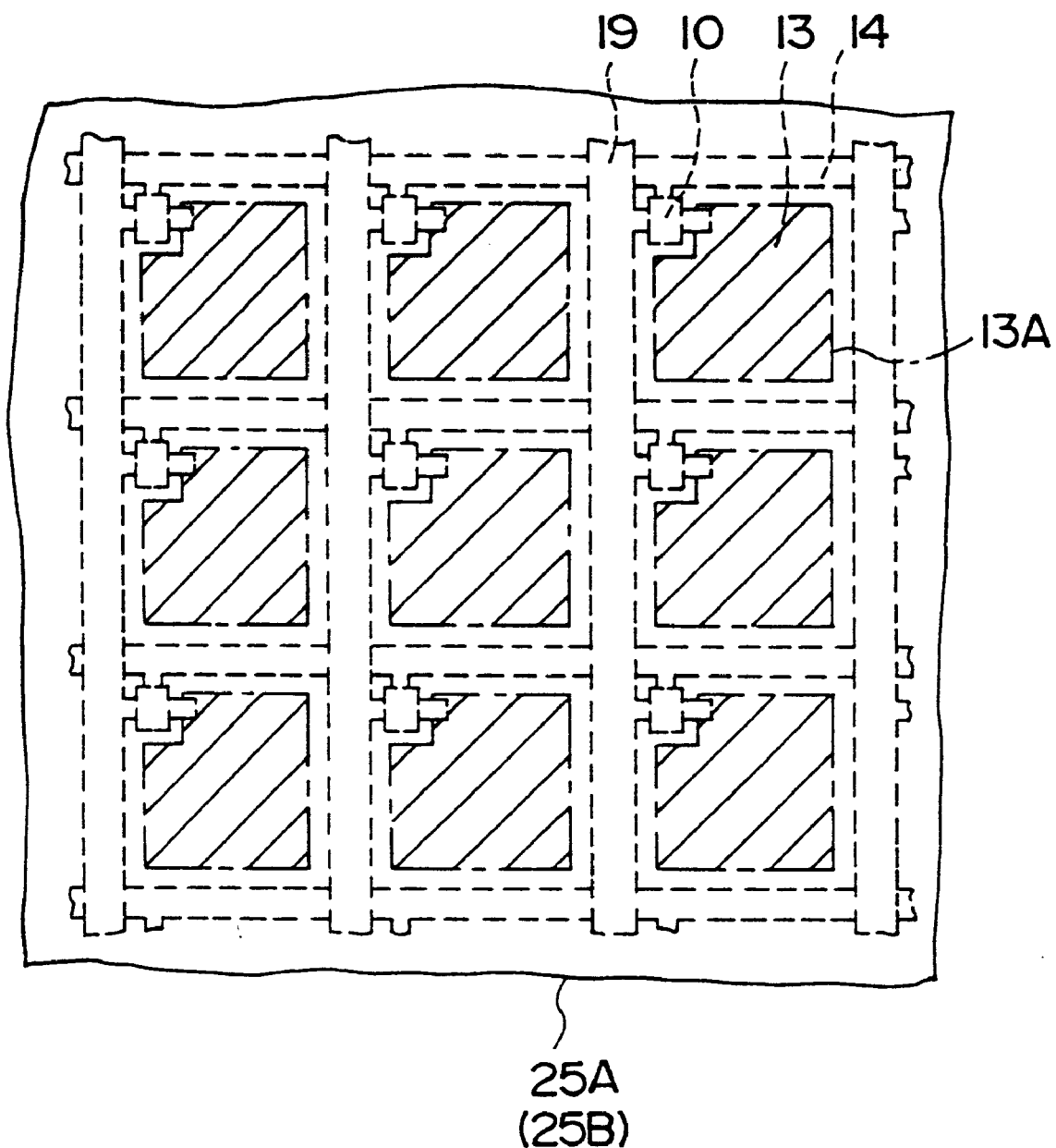
FIG. 19 is a plan view of a liquid crystal panel in which regions rubbed according to the same-directional rubbing and the other regions radiated by electro-magnetic wave are shown according to a third embodiment.

A plan view of the first alignment film 25A arranged on the first transparent substrate 11 on which the active element 20 is arranged is shown in FIG. 19.

Figure 20A:
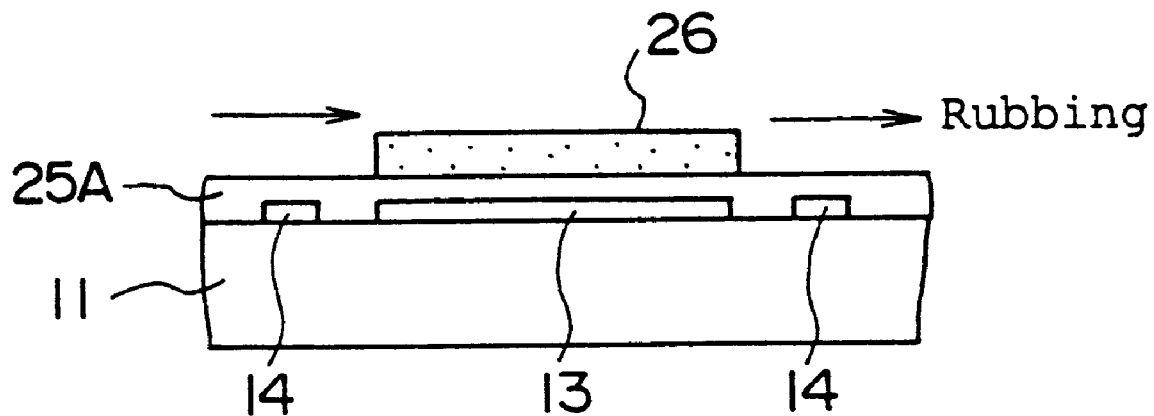
FIG. 20(a) is a cross sectional view showing a rubbing process performed for the liquid crystal panel shown in FIG. 19.

After the first alignment film 25A is formed on the first transparent substrate 11, as shown in FIG. 20(a), the pixel regions 13A of the first alignment film 25A placed just over the pixel electrodes 13 are covered with first resist films 26. Thereafter, remaining surfaces of the first alignment film 25A not covered with any first resist mask 26 are rubbed in a particular rubbing direction, and the first resist masks 26 are removed. Therefore, the pre-tilt angle of liquid crystal molecules placed on the remaining surfaces of the first alignment film 25A rubbed is set to about 6 degrees.

Figure 20B:
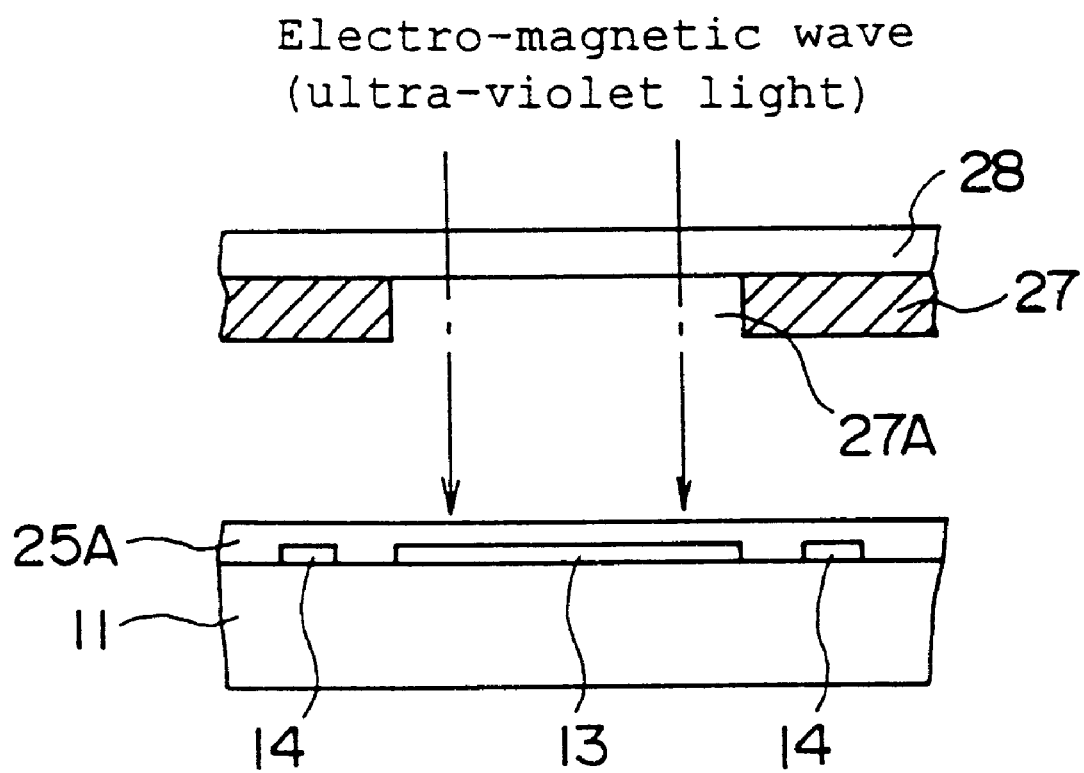
FIG. 20(b) is a cross sectional view showing the radiation of the electro-magnetic wave to the liquid crystal panel shown in FIG. 19.

Thereafter, as shown in FIG. 20(b), a photomask 27 arranged on a polarizing plate 28 is prepared. The photomask 27 has a plurality of windows 27A placed just above the pixel regions 13A of the first alignment film 25A. Thereafter, the pixel regions 13 A of the first alignment film 25A are radiated by ultra-violet light representing electromagnetic wave through the polarizing plate 28 and the windows 27A of the photomask 27. In this case, the ultraviolet light passing through the polarizing plate 28 is linearly polarized in a polarization direction perpendicular to the particular rubbing direction. Also, the strength of the ultraviolet light is set to about 15 J/cm$^2$. Therefore, major axes of liquid crystal molecules placed on the pixel regions 13 A of the first alignment film 25A which are radiated by the ultra-violet light linearly polarized in the polarization direction are oriented in the same polarization direction.

The above rubbing processing and the radiation of the ultra-violet light are also performed for the second alignment film 25B arranged on the second transparent substrate 11 on which any active element is not arranged, in the same manner. That is, portions of the second alignment film 25B placed just above the pixel electrodes 13 are radiated by the ultra-violet light linearly polarized in the polarization direction to orient major axes of liquid crystal molecules placed on the portions of the second alignment film 25B in the same polarization direction, and remaining portions of the second alignment film 25B are rubbed in a rubbing direction perpendicular to the polarization direction according to a normal rubbing.

Thereafter, the liquid crystal 17 is packed between first and second alignment films 25A and 25B, and a liquid crystal display panel manufactured as the first example of the third embodiment is obtained.

The saturation voltage $V_{sat}$ of the liquid crystal display panel and the defective ratio R of the pixels are examined and listed on Table 2 as the first example. In this case, the saturation voltage $V_{sat}$ is defined as a voltage value at which the light transmittance is 1% on condition that the light transmittance is set to 100% when any voltage is not applied to the scanning bus lines 14 of the normally white mode type crystal panel. Also, the defective ratio R is expressed by the number of pixels judged to be defective among 500 pixels.

Also, a first liquid crystal display panel (not shown) in which all surfaces of the first and second alignment films 25A and 25B are rubbed according to the same-directional rubbing is prepared, and the saturation voltage $V_{sat}$ of the first liquid crystal display panel and the defective ratio R of the pixels are listed in Table 2 as a first comparing sample. Also, a second liquid crystal display panel (not shown) in which all surfaces of the first and second alignment films 25A and 25B are radiated by the ultra-violet light linearly polarized is prepared, and the saturation voltage $V_{sat}$ of the second liquid crystal display panel and the defective ratio R of the pixels are listed in Table 2 as a second comparing sample. The configurations and manufacturing conditions of the first and second liquid crystal display panels are the same as those of the liquid crystal display panel manufactured as the first example of the third embodiment.

TABLE 2

|  | first example | first comparing sample | second comparing sample |
|---|---|---|---|
| $V_{sat}$ | 2.71 V | 3.16 V | 2.7 V |
| R | 0 | 0 | 180 |

As is apparent in Table 2, in case of the first liquid crystal display panel (the first comparing sample), though the defective ratio R of the pixels is zero, the saturation voltage $V_{sat}$ is not lowered. Also, in case of the second liquid crystal display panel (the second comparing sample), though the saturation voltage $V_{sat}$ is lowered, the defective ratio R of the pixels is high. In contrast, in case of the liquid crystal display panel manufactured as the first example of the third embodiment, the defective ratio R of the pixels is zero, and the saturation voltage $V_{sat}$ is lowered. Therefore, a merit that the saturation voltage $V_{sat}$ is lowered by the decrease of the anchoring energy caused by the radiation of the ultra-violet light and another merit that the orientation of the liquid crystal molecules toward the same direction is stabilized by the rubbing processing can be obtained in the liquid crystal display panel according to the third embodiment.

Also, after all surfaces of the first and second alignment films 25A and 25B are rubbed in a rubbing direction according to the same-directional rubbing, the pixel regions 13A of the first alignment film 25A and the portion of the second alignment film 25B arranged just above the pixel electrodes 13 are radiated by the ultra-violet light linearly polarized in the polarization direction perpendicular to the rubbing direction through the windows 27A of the photomask 27. In this case, the saturation voltage $V_{sat}$ is 2.75 V which is sufficiently low, and the defective ratio R of the pixels is zero. Therefore, because the formation of the resist mask 26 is not required, the manufacturing method of the display panel according to the third embodiment can be simplified, and a throughput of the display panels can be improved.

(Second Example)

A distance between each of the pixel electrodes 13 (or pixels) and each of the bus lines 14 and 19 in the liquid crystal display panel manufactured as the first example is shortened to 5 μm in a second example. In this case, the defective ratio R of the pixels is undesirably increased to about 280.

Therefore, the first alignment film 25A on the first transparent substrate 11 on which the active element 20 is arranged is not radiated by the ultra-violet light, but all surface of the first alignment film 25A is rubbed according to the same-directional rubbing. Also, as for the second alignment film 25B on the second transparent substrate 12 on which any active element is not arranged, the portions of the second alignment film 25B placed just above the pixel electrodes 13 is radiated by the ultra-violet light linearly polarized in the same manner as in the first example, and remaining portions of the second alignment film 25B are rubbed according to a normal rubbing.

In this case, the saturation voltage $V_{sat}$ of the liquid crystal display panel is 2.85, and the defective ratio R of the pixels is zero. Therefore, the display panel can be operated by applying a lower voltage to the display panel as compared with the applied voltage in the conventional display panel.

(Third Example)

A distance between each of the pixel electrodes 13 (or pixels) and each of the bus lines 14 and 19 in the liquid crystal display panel manufactured as the first example is also shortened to 5 μm in a third example. In this case, the defective ratio R of the pixels is undesirably increased to about 280.

Therefore, the defective ratio R of the pixels is reduced by changing the pre-tilt angle of liquid crystal molecules arranged on the other portions of the first or second alignment film 25A or 25B which are not placed just over or above any pixel electrode 13.

In detail, as a material of the first and second alignment films 25A and 25B, JALS-214 (trade name) manufactured by a Nippon Gosei Gomu (Japan Synthetic Rubber) Corp. is used. The pre-tilt angle can be easily adjusted by using the material. The adjustment of the pre-tilt angle is performed by changing one of the rubbing conditions. For example, the pre-tilt angle is lowered as the number of rubbing operations repeated is increased, and the pre-tilt angle is lowered as the pushing degree of the rubbing cloth 21a in the alignment film 25A or 25b is increased.

Figure 21:
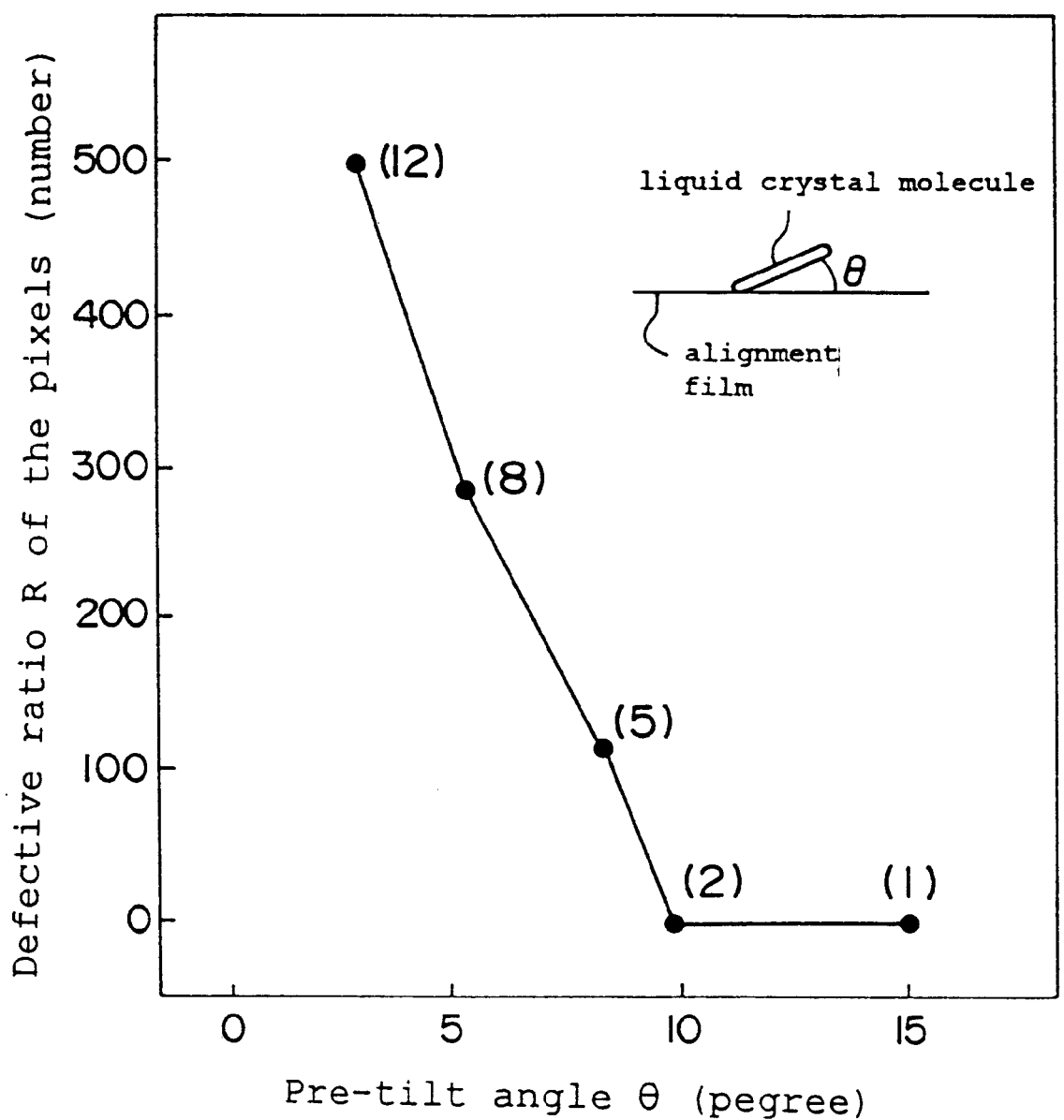
FIG. 21 shows a relationship between a defective ratio R of pixels and a pre-tilt angle θ, according to the third embodiment.

When the pre-tilt angle θ of the liquid crystal molecules on the alignment film 25A or 25B is changed by changing the number of rubbing operations repeated, a relationship between the defective ratio R of the pixels and the pre-tilt angle θ is shown in FIG. 21. A numeral written in parentheses indicates the number of rubbing operations repeated.

As shown in FIG. 21, when the pre-tilt angle θ is set to 10 degrees or more, the defective ratio R is reduced to zero. In this case, the saturation voltage $V_{sat}$ of the liquid crystal display panel is lowered to values ranging from 2.70 to 2.75 V regardless of the change of the pre-tilt angle θ.

(Fourth Example)

Figure 22A:
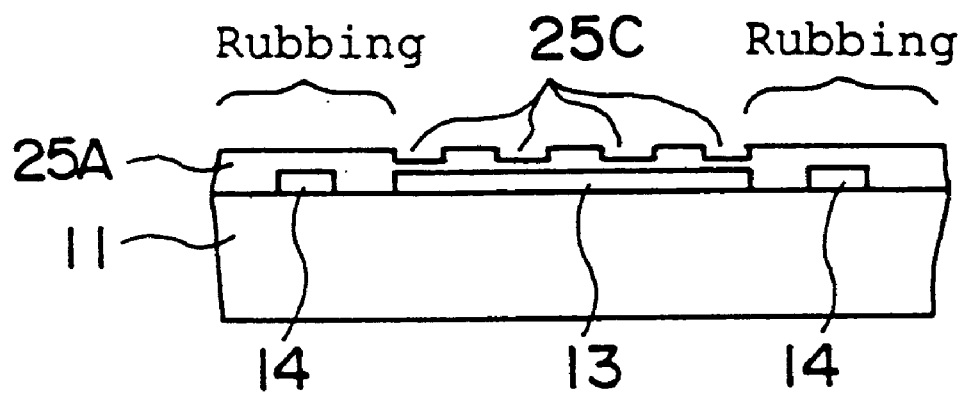
FIG. 22(a) is a cross sectional view of a liquid crystal display panel in which a plurality of grooves are formed in a pixel region of a first alignment film, according to the third embodiment.

In the above first to third examples, electro-magnetic wave such as ultra-violet light is radiated to the portions of the first or second alignment film 25A or 25B placed just over or above the pixel electrodes 13, and the anchoring energy of the portions of the first or second alignment film 25A or 25B is lowered. To lower the anchoring energy of the portions of the first or second alignment film 25A or 25B according to other methods, as shown in FIG. 22(a), a method for forming a plurality of grooves 25C direction on upper surfaces of the first or second alignment film 25A or 25B placed just over or above the pixel electrodes 13 is applicable. In this method, major axes of liquid crystal molecules placed on the upper surfaces of the first or second alignment film 25A or 25B are oriented toward a direction in which the grooves 25C extend.

Figure 22B:
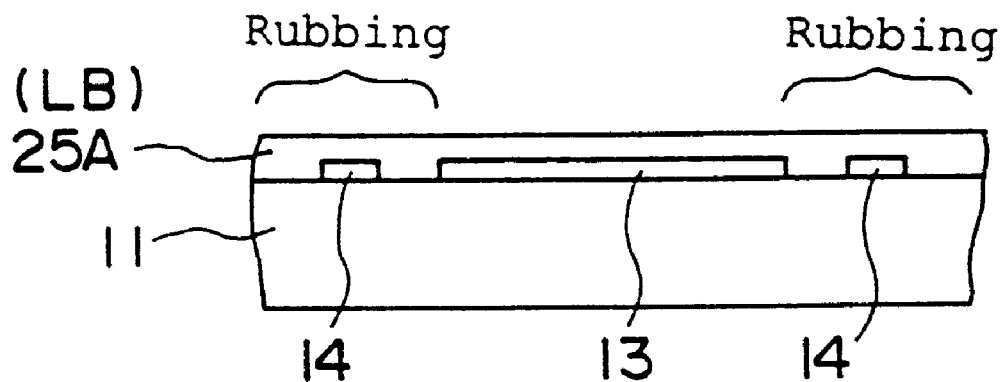
FIG. 22(b) is a cross sectional view of a liquid crystal display panel in which an LB film is used as a first alignment film, according to the third embodiment.

Also, as shown in FIG. 22(b), another method for using the LB film as a material of the first or second alignment film 25A or 25B is applicable. In this method, major axes of liquid crystal molecules placed on the first or second alignment film 25A or 25B are oriented toward a direction in which the LB film is pulled.

In the above methods, the other portions of the first or second alignment film 25A or 25B not arranged on or above any pixel electrode 13 are rubbed according to a normal rubbing.

(Fifth Example)

In the fourth embodiment, the anchoring energy of the portions of the first or second alignment film 25A or 25B placed just over or above the pixel electrodes 13 is lowered. However, in cases where the electric field E caused by a potential difference between the bus line 14 or 19 and the pixel electrode 13 greatly influences liquid crystal molecules placed on the first or second alignment film 25A or 25B, it is preferred that the frame-shaped regions 13B of the first alignment film 25A and the frame-shaped regions of the second alignment film 25B defined in the second example of the second embodiment (refer to FIG. 18(a)) be rubbed according to the same-directional rubbing as well as the other portions of the alignment films 25A and 25B.

Also, in cases where the electric field E caused by a potential difference between the scanning bus line 14 and the pixel electrode 13 greatly influences liquid crystal molecules placed on the first alignment film 25A, it is preferred that the gate-side regions 13D of the first alignment film 25A defined in the fifth example of the second embodiment (refer to FIG. 18(b)) be rubbed according to the same-directional rubbing.

In the third embodiment, the active element type twisted nematic (TN) liquid crystal display panel is used. However, even though another type liquid crystal display panel such as a simple matrix type TN liquid crystal display panel is used, the same effect can be obtained.

Next, a third embodiment is described.

Figure 23A:
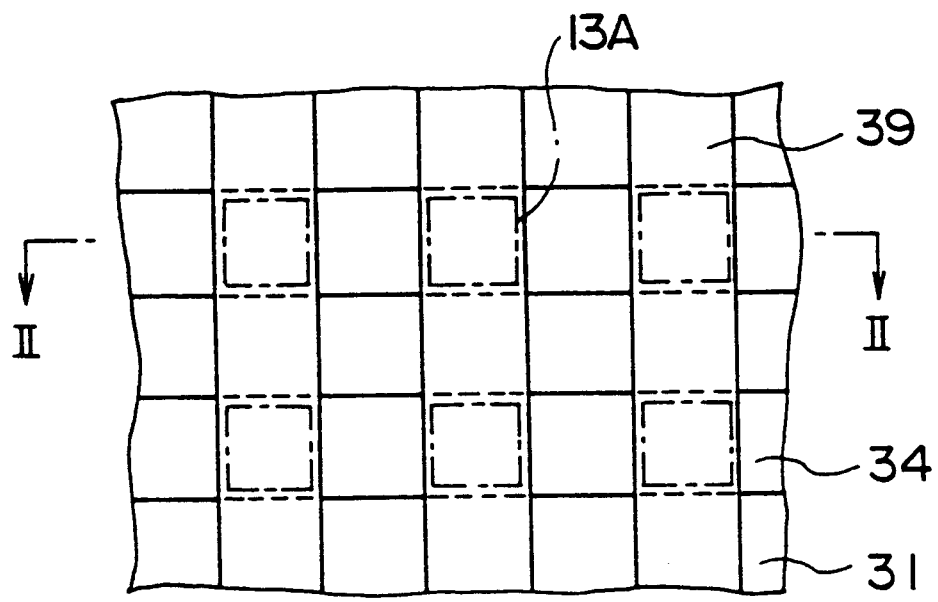
FIG. 23(a) is a plan view of a simple matrix type TN liquid crystal display panel according to a fourth embodiment of the present invention.
Figure 23B:
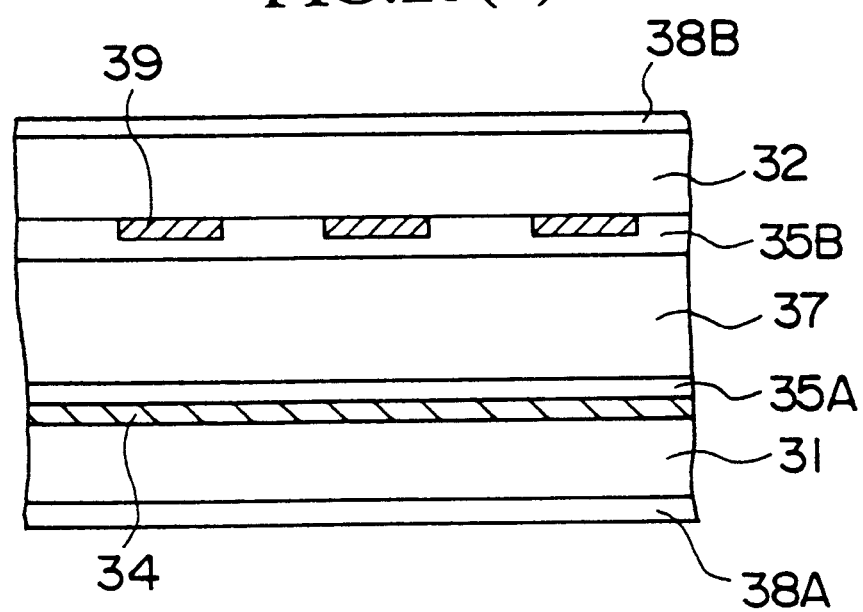
FIG. 23(b) is a cross sectional view of the simple matrix type TN liquid crystal display panel shown in FIG. 23(a).

FIG. 23(a) is a plan view of a simple matrix type TN liquid crystal display panel according to a third embodiment of the present invention. FIG. 23(b) is a cross sectional view of the simple matrix type TN liquid crystal display panel shown in FIG. 23(a).

As shown in FIGS. 23(a) and 23(b), a plurality of scanning wiring lines 34 spaced at regular intervals are arranged in parallel on a first surface of a first transparent substrate 31, and the first surface of the first transparent substrate 31 and the plurality of scanning wiring lines 34 are covered with a first alignment film 35A. Also, a plurality of data wiring lines 39 spaced at regular intervals are arranged in parallel on a first surface of a second transparent substrate 32 facing the first surface of the first transparent substrate 31. The first surface of the second transparent substrate 32 and the data wiring lines 39 are covered with a second alignment film 35B. The first surfaces of the first and second alignment films 35A and 35B face each other through a liquid crystal 37 packed, and an extending direction of the scanning wiring lines 34 is perpendicular to that of the data wiring lines 39. In addition, a polarizing plate 38A is arranged on a second surface of the first transparent substrate 31, and a polarizing plate 38B is arranged on a second surface of the second transparent substrate 32.

In the above configuration of a simple matrix type TN liquid crystal display panel, each of the pixel regions 13A is placed in a region of the first alignment film 35A in which one scanning wiring line 34 and one data wiring line 39 cross over each other. Also, each of the pixel regions is placed in a region of the second alignment film 35B in which one scanning wiring line 34 and one data wiring line 39 cross over each other.

The anchoring energy of liquid crystal molecules placed on the pixel regions 13A of the first alignment film 35A is lowered by rubbing the pixel regions 13A according to the opposite-directional rubbing, by radiating the ultra-violet light linearly polarized to the pixel regions 13A, by arranging a plurality of grooves on the first surface of the first alignment film 35A or by using the LB film as a material of the first surface of the first alignment film 35A. Also, the anchoring energy of liquid crystal molecules placed on other portions of the first alignment film 35A is heightened by rubbing the other portions of the first alignment film 35A according to the same-directional rubbing.

Therefore, the liquid crystal molecules placed on the pixel regions 13A can easily rise up when a voltage is applied to the scanning wiring lines 34, so that an operation voltage required to operate the simple matrix type TN liquid crystal display panel according to the fourth embodiment can be lowered. Also, because a rising motion of the liquid crystal molecules placed on the other portions of the first alignment film 35A is slowly performed, the generation of defective pixels can be prevented.

It is applicable that the distribution of the anchoring energy in the second alignment film 35B be formed in the same manner as that in the first alignment film 35A. In this case, the liquid crystal molecules placed on the second alignment film 35B rise up in the same manner as those on the first alignment film 35A.

What is claimed is:

1. A liquid crystal display apparatus, comprising:
    a first substrate;
    a second substrate, a first surface of the second substrate facing a first surface of the first substrate;
    a scanning wiring line extending toward a scanning direction between the first substrate and the second substrate facing each other;
    a data wiring line extending toward a data direction between the first substrate and the second substrate on condition that the data wiring line crosses over the scanning wiring line in insulation condition;
    a first alignment film arranged on the first surface of the first substrate, a pixel region of the first alignment film being placed in a crossing-over portion of the first alignment film in which the scanning wiring line crosses over the data wiring line or being placed in a surrounding portion of the first alignment film surrounded by the scanning wiring line and the data wiring line;

a second alignment film arranged on the first surface of the second substrate, a pixel region of the second alignment film being placed in a crossing-over portion of the second alignment film in which the scanning wiring line crosses over the data wiring line or being placed in a surrounding portion of the second alignment film surrounded by the scanning wiring line and the data wiring line; and a liquid crystal arranged between the first alignment film and the second alignment film, liquid crystal molecules of the liquid crystal being arranged on a first surface of the first alignment film or a first surface of the second alignment film, wherein an anchoring energy of liquid crystal molecules placed on the pixel region of the first alignment film or placed on the pixel region of the second alignment film is lower than that of liquid crystal molecules placed on a remaining portion of the first or second alignment film out of the pixel region.

2. The liquid crystal display apparatus according to claim 1, further comprising:

a pixel electrode arranged on the first or second substrate to place the pixel region of the first alignment film or the pixel region of the second alignment film just over the pixel electrode; and an active element, arranged on the first or second substrate, for electrically connecting the data wiring line to the pixel electrode in cases where a signal voltage is applied to the scanning wiring line.

3. The liquid crystal display apparatus according to claim 1, wherein each of the pixel regions of the first alignment film is composed of a central region and a peripheral region near to one of the scanning wiring lines, and an anchoring energy of liquid crystal molecules placed on the central regions of the first alignment film being lower than that of liquid crystal molecules placed on the peripheral regions of the first alignment film.

4. The liquid crystal display apparatus according to claim 1, wherein each of the pixel regions of the first alignment film is composed of a central region and a peripheral region surrounding the central region, and an anchoring energy of liquid crystal molecules placed on the peripheral regions of the first alignment film is higher than that of liquid crystal molecules placed on the central regions of the first alignment film.

5. The liquid crystal display apparatus according to claim 1, wherein a plurality of pixel regions of the second alignment film are placed just above the pixel electrodes, a plurality of off-pixel regions of the second alignment film are placed on regions out of the pixel electrodes to surround the pixel regions of the second alignment film, an anchoring energy of liquid crystal molecules placed on the pixel regions of the second alignment film is lower than that of liquid crystal molecules placed on the off-pixel regions of the second alignment film.

6. The liquid crystal display apparatus according to claim 1, wherein an anchoring energy of liquid crystal molecules placed on the second alignment film is lower than that of liquid crystal molecules placed on the pixel regions of the first alignment film.

7. The liquid crystal display apparatus according to claim 1, wherein a pre-tilt angle of liquid crystal molecules placed on the off-pixel regions of the first alignment film or placed on off-pixel regions of the second alignment film which are not arranged just above any of the pixel electrodes is 1 degrees or more.

8. A liquid crystal display apparatus, comprising:

a first substrate;

a plurality of scanning wiring lines arranged on a first surface of the first substrate and spaced at prescribed intervals;

a plurality of data wiring lines arranged on the first surface of the first substrate and spaced at prescribed intervals on condition that the data wiring lines cross over the scanning wiring lines in insulation condition;

a plurality of pixel electrodes respectively arranged on a portion of the first substrate surrounded by one of the scanning wiring lines and one of the data wiring lines;

a plurality of active elements, arranged on the first surface of the first substrate, for electrically connecting the pixel electrodes to the data wiring lines in one-to-one correspondence in cases where a voltage signal is applied to the scanning lines;

a first alignment film arranged on the first surface of the first substrate, the pixel electrodes, the scanning wiring lines and the data wiring lines, a plurality of pixel regions of the first alignment film being placed just over the pixel electrodes, a plurality of off-pixel regions of the first alignment film being placed on regions out of the pixel electrodes to surround the pixel regions, an anchoring energy of liquid crystal molecules placed on the pixel regions of the first alignment film being lower than that of liquid crystal molecules placed on the off-pixel regions of the first alignment film;

a second substrate of which a first surface faces the first surface of the first substrate;

a counter electrode arranged on the first surface of the second substrate;

a second alignment film arranged on the counter electrode; and a liquid crystal arranged between the first alignment film and the second alignment film, the liquid crystal being composed of a plurality of liquid crystal molecules.

9. The liquid crystal display apparatus according to claim 8, wherein each of the pixel regions of the first alignment film is composed of a central region and a peripheral region near to one of the scanning wiring lines, and an anchoring energy of liquid crystal molecules placed on the central regions of the first alignment film being lower than that of liquid crystal molecules placed on the peripheral regions of the first alignment film.

10. The liquid crystal display apparatus according to claim 8, wherein each of the pixel regions of the first alignment film is composed of a central region and a peripheral region surrounding the central region, and an anchoring energy of liquid crystal molecules placed on the peripheral regions of the first alignment film is higher than that of liquid crystal molecules placed on the central regions of the first alignment film.

11. The liquid crystal display apparatus according to claim 8, wherein a plurality of pixel regions of the second alignment film are placed just above the pixel electrodes, a plurality of off-pixel regions of the second alignment film are placed on regions out of the pixel electrodes to surround the pixel regions of the second alignment film, an anchoring energy of liquid crystal molecules placed on the pixel regions of the second alignment film is lower than that of liquid crystal molecules placed on the off-pixel regions of the second alignment film.

12. A liquid crystal display apparatus according to claim 8, wherein an anchoring energy of liquid crystal molecules placed on the second alignment film is lower than that of liquid crystal molecules placed on the pixel regions of the first alignment film.

13. The liquid crystal display apparatus according to claim 8, wherein a pre-tilt angle of liquid crystal molecules placed on the off-pixel regions of the first alignment film or placed on off-pixel regions of the second alignment film which are not arranged just above any of the pixel electrodes is 10 degrees or more.

* * * * *